US008271649B2

(12) United States Patent
Kalofonos et al.

(10) Patent No.: US 8,271,649 B2
(45) Date of Patent: Sep. 18, 2012

(54) ACCESS RIGHTS USED FOR RESOURCE DISCOVERY IN PEER-TO-PEER NETWORKS

(75) Inventors: Dimitris Kalofonos, Cambridge, MA (US); Zoe Antoniou, Belmont, MA (US); Franklin Reynolds, Bedford, MA (US)

(73) Assignee: Nokia Corporation, Espoo (FI)

( * ) Notice: Subject to any disclaimer, the term of this patent is extended or adjusted under 35 U.S.C. 154(b) by 415 days.

(21) Appl. No.: 11/897,444

(22) Filed: Aug. 30, 2007

(65) Prior Publication Data

US 2009/0063691 A1    Mar. 5, 2009

(51) Int. Cl.
G06F 15/173 (2006.01)
G06F 15/16 (2006.01)

(52) U.S. Cl. .................. 709/225; 709/229

(58) Field of Classification Search .......... 709/238–244, 709/217–219, 223–229
See application file for complete search history.

(56) References Cited

U.S. PATENT DOCUMENTS

| | | | | |
|---|---|---|---|---|
| 5,408,619 A * | 4/1995 | Oran | ................ | 707/10 |
| 5,826,010 A * | 10/1998 | Joseph et al. | ................ | 726/4 |
| 6,453,353 B1 * | 9/2002 | Win et al. | ................ | 709/229 |
| 6,539,481 B1 * | 3/2003 | Takahashi et al. | ................ | 726/5 |
| 6,990,491 B2 * | 1/2006 | Dutta et al. | ................ | 707/9 |
| 7,124,305 B2 * | 10/2006 | Margolus et al. | ................ | 713/193 |
| 7,210,163 B2 * | 4/2007 | Stoll | ................ | 726/2 |
| 7,451,217 B2 * | 11/2008 | Wardrop | ................ | 709/225 |
| 7,475,139 B2 * | 1/2009 | Goodman et al. | ................ | 709/225 |
| 7,480,657 B1 * | 1/2009 | Glovin et al. | ................ | 707/10 |
| 7,536,184 B2 * | 5/2009 | Poczo | ................ | 455/432.3 |
| 7,594,268 B1 * | 9/2009 | Sobel | ................ | 726/23 |
| 2003/0044020 A1 * | 3/2003 | Aboba et al. | ................ | 380/278 |
| 2003/0177356 A1 * | 9/2003 | Abela | ................ | 713/168 |
| 2004/0088347 A1 * | 5/2004 | Yeager et al. | ................ | 709/202 |
| 2004/0128697 A1 * | 7/2004 | Wood et al. | ................ | 725/115 |
| 2004/0148611 A1 * | 7/2004 | Manion et al. | ................ | 719/328 |
| 2004/0193746 A1 * | 9/2004 | Koyama | ................ | 710/9 |
| 2005/0044411 A1 * | 2/2005 | Somin et al. | ................ | 713/201 |
| 2006/0253456 A1 * | 11/2006 | Pacholec et al. | ................ | 707/10 |
| 2006/0265508 A1 * | 11/2006 | Angel et al. | ................ | 709/230 |
| 2007/0089162 A1 * | 4/2007 | Park et al. | ................ | 726/1 |

(Continued)

OTHER PUBLICATIONS

Bryan Ford , Jacob Strauss , Chris Lesniewski-Laas , Sean Rhea, Frans Kaashoek, Robert Morris, Persistent personal names for globally connected mobile devices, Proceedings of the 7th symposium on Operating systems design and implementation, Nov. 6-8, 2006, Seattle, Washington.*

(Continued)

*Primary Examiner* — Brendan Higa
(74) *Attorney, Agent, or Firm* — Ditthavong Mori & Steiner, P.C.

(57) ABSTRACT

Secure resource discover in peer-to-peer networks involves creating a resource discovery record associated with a computing resource of a user device that is made available via the user device to peers of a peer-to-peer network. The resource discovery record describes the computing resource and may be independent of native service discovery mechanisms of the peer-to-peer network. An access right record is created that controls the ability of one or more contacts to gain access to the resource discovery record. The resource discovery record is sent to the one or more contacts via the peer-to-peer network. The one or more contacts can use the resource discovery record to access the computing resource via the peer-to-peer network in accordance with the access right record.

27 Claims, 16 Drawing Sheets

U.S. PATENT DOCUMENTS

2007/0226220 A1* 9/2007 Aronoff et al. .................. 707/8
2008/0059608 A1* 3/2008 Wood et al. .................. 709/219
2008/0114799 A1* 5/2008 Chasen ........................ 707/101
2009/0059952 A1 3/2009 Kalofonos et al.

OTHER PUBLICATIONS

JXTA v2.0 Protocols Specification, Project JSTA found at: http://www.ixta.org Revision 2.5.3 dated Oct. 16, 2007, 34 pages.

* cited by examiner

ACCESS RIGHTS USED FOR RESOURCE DISCOVERY IN PEER-TO-PEER NETWORKS

FIELD OF THE INVENTION

This invention relates in general to computer networks, and more particularly to secure resource discovery in peer-to-peer networks.

BACKGROUND OF THE INVENTION

Social networks are gaining increasing momentum and market importance in the Internet. The current paradigm is that of centralized or web-based social networks. According to this paradigm, a number of users create communities to interact and share content online by accessing a centralized web-site, which acts as a central repository that exposes the resources that each user uploads to share with the community.

Recently, a number of technologies in peer-to-peer (P2P) networking have been developed which will enable a decentralized P2P paradigm of social networking. In this paradigm, users will be able to easily organize their resources (e.g. devices, services, content, contacts) to form personal networks, and use these to interact and share with other people's personal networks. In contrast to the centralized social networking one, this paradigm relies on no central repository that exposes the resources of each user to the community. Instead, content and services are exposed directly by the user's own devices, often in real-time as they are created.

One of the challenges in the P2P social networking paradigm is that service and content discovery can no longer rely on some central authority, but must be supported by the user's devices in a P2P manner. Furthermore, because P2P social networking involves users' own personal devices, contacts, and content/services therein, there is a much more urgent need to protect user privacy by controlling who can discover what among the list of resources owned by each user. Most widely-used discovery frameworks do not incorporate any access control or security mechanism, making it impossible for users to control what others can discover.

Therefore, there is a need in P2P social networking for a new resource discovery framework that is suitable for decentralized P2P networks and incorporates security to protect users' privacy and information.

SUMMARY OF THE INVENTION

To overcome limitations in the prior art described above, and to overcome other limitations that will become apparent upon reading and understanding the present specification, the present invention discloses a system, apparatus and method for secure resource discovery in peer-to-peer networks. In accordance with one embodiment of the invention, a method involves creating a resource discovery record associated with a computing resource of a user device that is made available via the user device to peers of a peer-to-peer network. The resource discovery record describes how to access the computing resource via the peer-to-peer network. The method further involves creating an access right record that controls the ability of one or more contacts to gain access to the resource discovery record via the peer to peer network, and sending the resource discovery record to one or more contacts via a peer-to-peer network.

In a more particular embodiment, the resource discovery record is independent of native service discovery mechanisms of the peer-to-peer network. In another more particular embodiment, the method further involves replicating the resource discovery record and the access rights record of the user device to a respective second resource discovery record and second access rights record of additional devices that form, with the user device, a personal device cluster. The method may further involve sending the access right record to the one or more contacts via the peer-to-peer network in conjunction with the sending of the resource discovery record to the one or more contacts, or may further involve sending the access right record to the one or more contacts via the peer-to-peer network before the sending of the resource discovery record.

In a more particular embodiment, the method further involves receiving a request for the computing resource via the peer-to-peer network, determining a service application corresponding to the request based on the resource discovery record associated with the computing resource, and launching the service application in response to the request, wherein the operation of the service application is modified based on the access right document associated with the resource discovery record. In such a case, the method may also involve authenticating the sender of the request before launching the service application.

In another embodiment of the invention, a method involves receiving, at a user device, a resource record associated with a computing resource available via a peer device of a peer-to-peer network. The record describes the computing resource and is associated with user-specific rights allowing a user of the user device to access the computing resource. The method further involves presenting, via a user interface, a graphical component representing the computing resource and sending, to the peer in response to a selection of the graphical component, a request to access the computing resource. The computing resource is utilized according to instructions in the resource record.

In a more particular embodiment, the resource record is independent of native service discovery mechanisms of the peer-to-peer network. The resource record may include a resource discovery record that describes how to access the computing resource and is associated with an access right record that defines the user-specific rights and/or an access right record that defines the user-specific rights and is associated with a resource discovery record that describes how to access the computing resource. In another more particular embodiment, the method further involves replicating the resource record of the user device to a respective second resource discovery record of additional devices that form, with the user device, a personal device cluster.

In a more particular embodiment, the resource record includes at least one of a resource discovery record that describes how to access the computing resource and an access right record that defines the user specific rights utilizing the computing resource. In such a case, the method further involves receiving, via the user-interface, a user request to access the computing resource, determining a client application corresponding to the request based on the resource record associated with the computing resource, and launching the client application in response to the user request, wherein the operation of the client application is modified based on a usage permission record associated with the resource record that describes the computing resource.

In another embodiment of the invention, a computer-readable storage medium has instructions executable by a processor of a user device to create a resource discovery record associated with a computing resource of the user device capable of being offered via the peer-to-peer network. The resource discovery record describes how to access the computing resource via the peer-to-peer network. The instructions further cause the processor to create an access right record that controls the ability of one or more contacts to gain access to the resource discovery record and send the resource discovery record to the one or more contacts via the peer-to-peer network.

In another embodiment of the invention, computer-readable storage medium has instructions executable by a processor of a user device to receive a resource record associated with a computing resource available via a peer device of a peer-to-peer network. The record describes the computing resource and is associated with user-specific rights allowing a user of the user device to access the computing resource. The instructions further cause the processor to present, via a user interface, a graphical component representing the computing resource, and send, to the peer in response to a selection of the graphical component, a request to access the computing resource. The user device utilizes the computing resource according to instructions in the resource record.

In another embodiment of the invention, a system includes a first and second device capable of being coupled as peers via a peer-to-peer network. The first device includes means for creating a resource discovery record associated with a computing resource of the first device that is made available via the peer-to-peer network; means for creating an access right record that controls the ability of the second device to gain access to the resource record via the peer-to-peer network; and means for sending the resource discovery record to the second device via the peer-to-peer network. The second device includes means for receiving the resource discovery record; means for presenting, to a user of the second device, a graphical component representing the computing resource; means for sending, to the first device in response to a user selection of the graphical component, a request to access the computing resource; and means for utilizing the computing resource according to instructions in the resource discovery record.

In a more particular embodiment, the system further includes first additional devices that form a first personal device cluster with the first device via the peer-to-peer network. The first device further includes means for replicating the resource discovery record to the first additional devices, so that the second device is capable of utilizing the computing resource via any of the first additional devices.

In another more particular embodiment, the system further includes second additional devices that form a second personal device cluster with the second device via the peer-to-peer network. The second device further includes means for replicating the resource discovery record to the second additional devices. The access right record further controls the ability of the second device cluster to gain access to the resource record via the peer-to-peer network so that any of the second additional devices are capable of utilizing the computing resource according to instructions in the resource discovery record.

In another embodiment of the invention, a method involves creating a resource discovery record associated with a computing resource of a user device that is made available via the user device to peers of a peer-to-peer network. The resource discovery record describes the computing resource and is independent of native service discovery mechanisms of the peer-to-peer network. The method also involves creating an access right record that controls the ability of one or more contacts to gain access to the resource discovery record, and sending the resource discovery record to the one or more contacts via the peer-to-peer network. The one or more contacts can use the resource discovery record to access the computing resource via the peer-to-peer network in accordance with the access right record.

In another embodiment of the invention, an apparatus includes a network interface capable of connecting to a peer-to-peer network, a processor coupled to the network interface; and memory coupled to the processor. The memory includes a computing resource capable of being offered via the peer-to-peer network and a resource management module that causes the processor to create a resource discovery record associated with the computing resource. The memory also includes a permissions manager that causes the processor to create an access right record that controls the ability of one or more contacts to gain access to the resource discovery record, and a resource discovery server that causes the processor to send the resource discovery record to the one or more contacts via the network in accordance with the access right record.

The memory may also include any of: a) resource discovery server that sends the access right record to the one or more contacts via the network before the sending of the resource discovery record; b) a resource discovery server that causes the processor to provide, to a peer device of the one or more contacts, access to the computing resource of the apparatus associated with the resource discovery record in accordance with the access right record; c) a service application that is selected by the service application based on the resource discovery record associated with the one or more resources, launched in response to a request to access the computing resource from the device of the one or more resources. In the latter case, the resource discovery server may modify the operation of the service application based on the access right document associated with the resource discovery record. The memory may also a replication repository module that facilitates synchronization of the resource discovery record and the access rights record with a respective second resource discovery record and second access rights record of additional devices that form, with the apparatus, a personal device cluster.

In another embodiment of the invention, an apparatus includes a network interface capable of connecting to a peer-to-peer network, a processor coupled to the network interface; and memory coupled to the processor. The memory includes a resource discovery client that causes the processor to receive a resource record associated with a computing resource available via a peer device of a peer-to-peer network. The record describes the computing resource and is associated with user-specific rights allowing a user of the user device to access the computing resource. The memory includes a resource viewer that causes the processor to present, via a user interface, a graphical component representing the computing resource, and in response to a user selection of the graphical component, causes the resource discovery client to send in response to the peer a request to access the computing resource. The memory also includes a discovery module that causes the processor to utilize the computing resource according to instructions in the resource record.

In a more particular embodiment of the apparatus, the resource record is independent of native service discovery mechanisms of the peer-to-peer network. The resource record may include a resource discovery record that describes how to access the computing resource and is associated with an access right record that defines the user-specific rights, and/or the resource record may include an access right record that defines the user-specific rights and is associated with a resource discovery record that describes how to access the computing resource.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

Figure 1:
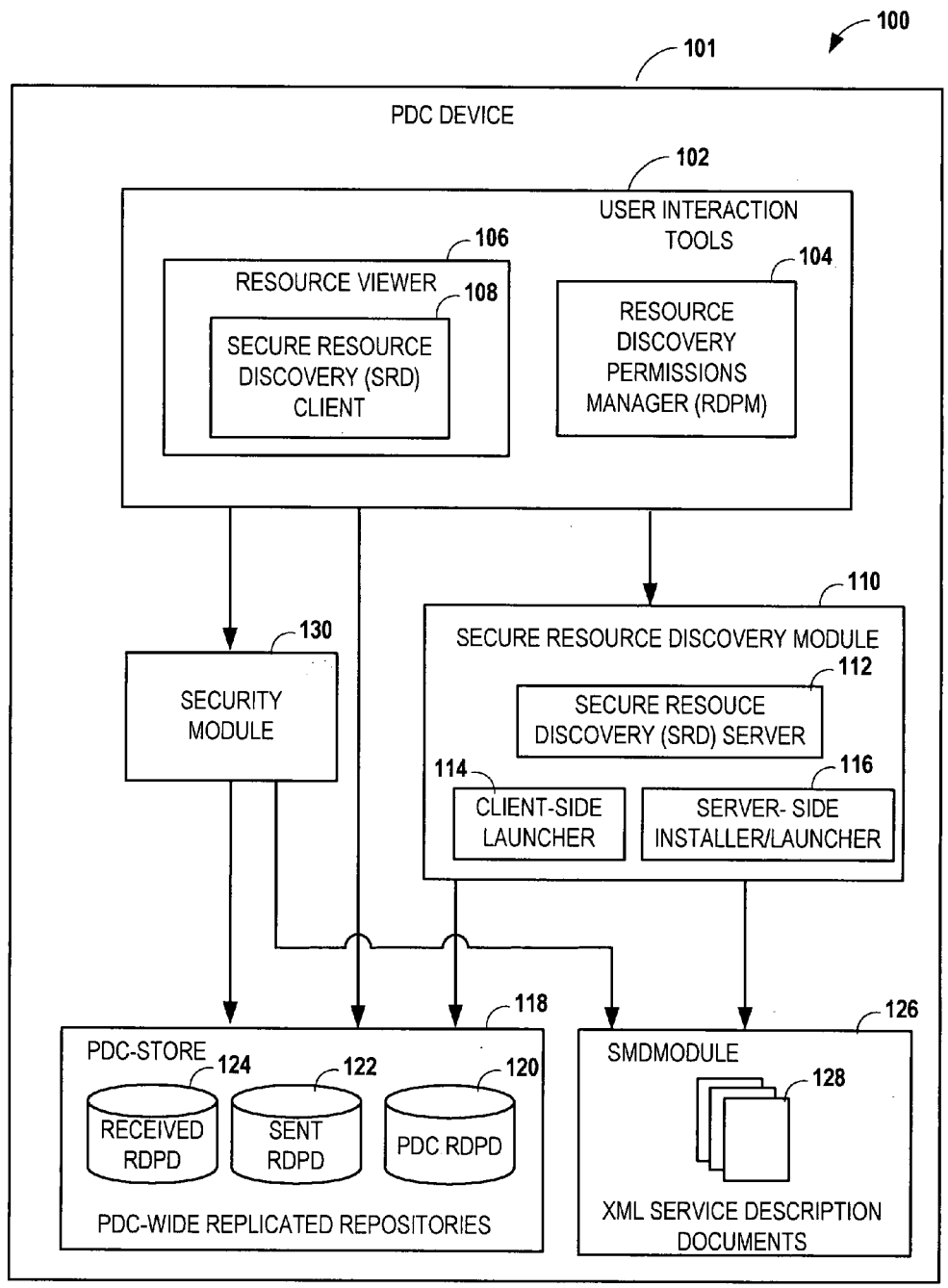
FIG. 1 is a block diagram illustrating an architecture according to embodiments of the invention.

DETAILED DESCRIPTION OF EMBODIMENTS
OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of various embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present disclosure is related to the field of service and resource discovery, in particular as applied to peer-to-peer overlays of personal devices in the context of social networks. Current service discovery frameworks can enable global service discovery though some centralized directory service, such as Universal Description, Discovery and Integration (UDDI), or localized discovery, using multicast-based advertisements or inquiries and local directories. Examples of the latter include Simple Service Discovery Protocol (SSDP), Service Location Protocol (SLP), and Bonjour (which is Apple™ Inc.'s implementation of Zeroconf). These widely-used P2P discovery frameworks do not incorporate any access control or security mechanism, making it impossible for users to control what others can discover. For example, UPnP has a link-local service discovery mechanism (e.g., using SSDP), but it does not incorporate security, is not applicable to P2P networks that do not emulate a link-local network, and is applicable only if the distributed services middleware is UPnP.

Recently, a number of technologies in peer-to-peer (P2P) networking have been developed, which will enable a decentralized P2P paradigm of social networking, whereby users will be able to easily organize their resources (e.g. devices, services, content, contacts) to form personal networks, and use these to interact and share with other people's personal networks. An example of these P2P networks includes Unmanaged Internet Architecture (UIA). UIA is an architecture for zero-configuration connectivity among mobile devices through personal names. Users assign personal names through an ad hoc device introduction process requiring no central allocation. Once assigned, names bind securely to the global identities of their target devices independent of network location.

An architecture such as UIA is one example of a distributed services middleware that provides basic network connectivity and discovery capabilities. An architecture referred to herein as MyNet can build on top of this type of P2P middleware to provide additional security to resource sharing. MyNet is a project name for the development tools and applications for simple, secure, personal overlay networks. MyNet utilizes an architecture such as UIA at the lower layers. In the P2P paradigm exemplified by MyNet, security is decoupled from physical connectivity, and establishment of trust is based on social connectivity.

In contrast to the centralized social networking one, in a P2P social networking framework there is no central repository that exposes the resources of each user to the community, but content and services are exposed directly by the user's own devices, often in real-time as they are created. Because P2P social networking involves users' own personal devices, contacts, and content/services therein, there is a need to protect user privacy by controlling who can discover what among the list of resources owned by each user. The resource discovery mechanism added by the middleware is independent from the underlying service discovery mechanism (if any) that is implemented as part of the "native" distributed services middleware. Such resource discovery is also independent from the underlying P2P system. This is achieved by introducing Resource Discovery Records (RDR) corresponding to devices, services, content, and contacts (users).

According to embodiments of the invention, each device that belongs to a user's personal network (also called Personal Device Cluster—PDC) is responsible for creating an RDR for each of the distributed services hosted by it, an RDR describing the device itself, and an RDR for each new user that this device is introduced to (also referred to as contact). Note that discovery records referring to content are also possible and are applicable to the invention, but may not be always necessary because content may be exposed by the distributed services themselves and can be discovered through them.

In reference now to FIG. 1, a block diagram illustrates a device architecture 100 according to an embodiment of the invention. This architecture 100 can be implemented an individual device 101 of a PDC, and/or some aspects (e.g., data storage, processor functions) may be distributed among multiple devices of a PDC. The device 101 may include any manner of wireless, wired, mobile and/or fixed computing device, such as Personal Computers (PCs), cell phones, Personal Digital Assistants (PDAs), mobile communication devices, positioning devices, (Digital Video Recorders (DVRs), TV, Set-top Boxes (STB), audio/video player, home appliance, embedded device, etc. or any combination of the aforementioned. Typically, such device 101 may include a user interface used to access user activation tools 102.

The user activation tools 102 include user interface elements that allow a user to make system changes, view system state, and generally directly or indirectly interact with components of the architecture 100. For example, a Resource Discovery Permissions Manager (RDPM) 104 allows a user to identify resources of the PDC that can be shared with other people, identify those other people, and define other aspects of the sharing arrangement (e.g., duration, bandwidth limitations, content access restrictions, etc.). A resource viewer 106 allows the user of this device 101 to discover, view, and utilize resources of other user devices compatible with the architecture 100.

The resource viewer 106 uses the information in each resource discovery record to create meaningful depictions of the discovered resources (contacts, devices, services, content) and communicate them to the user. The resource viewer 106 allows, for example, the user to see all resources known to all devices in his/her PDC. This is possible because the resource viewer 106 has access to a local PDC-store 118, which contains all corresponding discovery records 120, 122, 124. Furthermore, the 'resource viewer' component 106 of the interface tools 102 can be used to view resources in another user's PDC. This is done by sending a discovery request to any device in that other PDC and displaying the discovery records received as a response. To facilitate this, a Secure Resource Discover (SRD) client module 108 enables the user to browse through other user's resources via a network using secure discovery protocols described in greater detail hereinbelow.

The device 101 implementing the architecture 100 may include an SRD module 110 that allows the device 101 to serve resources to other network devices. Those other devices may include an SRD client 108 or equivalent that interacts with an SRD server 112 of the illustrated device 101. Resource discovery requests sent by resource viewers of remote devices are received by the SRD server 112, which first authenticates that the requesting device belongs to the user that that it claims. If this authentication succeeds, the SRD server 112 sets up a secure channel between the device 101 and the requesting device. The SRD server 112 then looks in the local PDC-store 118 to determine whether there exists a resource discovery permissions document that the user has created for the requesting user. If such a record is found, the SRD server 112 replies with only those discovery records that the user has authorized the requesting user to receive.

The SRD module 110 also includes a client-side launcher 114 and a server-side installer/launcher 116 that may facilitate utilization of computing resources by both the device 101 and other devices. The server-side installer/launcher 116 can detect available resources on the device and facilitate access to those resources when an external request is received via a network or other data interface.

The client-side launcher 114 enables the user to access a discovered distributed service. The client-side launcher 114 uses the information in the resource discovery records (e.g., records 124) to match a discovered service to an appropriate client application (not shown) installed locally. The client-side launcher 114 can then launch this identified application with the appropriate configuration so that it points to the discovered remote distributed service. The client-side application launcher 114 may also use information from usage permissions (in contrast to the resource discovery permissions mentioned above) that specify access rights to the discovered service, in order to customize the functionality exposed to the user. This, for example, could enable a customized launch of the client-side application to display to the user only the functionality that was authorized. Such a customized launch may, for example, be run using limited user account, given limited access to persistent storage, run in a virtual environment (e.g., runtime "sandbox," virtual OS, virtual computer/machine), given limited access to device drivers, etc.

The device 101 may be part of a larger group (cluster) of machines that make up the PDC. To facilitate uniform access to resources by the PDC and uniform provision of resources from the PDC, each device 101 of the PDC may contain a replicated PDC store 118. This store 118 may include a database 120 of one or more Resource Discovery Permission Documents (RDPD) that are intended to reflect a uniform view of PDC resources that is replicated to all devices in the PDC. The PDC RDPD database 120 uses replication to ensure changes to one device in a PDC are propagated to all other devices of the PDC. This replication mechanism is secure and accessible only to the devices belonging to the same PDC. Therefore, all devices in a user's PDC securely discover and have access to all resources (devices, services, content, contacts) belonging to the user's personal network.

The PDC store 118 may also track or distinguish between locally generated RDPDs 122 that were sent to devices outside the PDC, and remotely generated RDPDs 124 that were received from other devices outside the PDC. The data contained in the received RDPD 124 and PDC RDPD 120 may be combined via the resource viewer 106 so that a single consistent view of PDC and non-PDC resources can be presented to the user of the device 101. The data contained in the sent RDPD database 122 may the result of advertised services to remote devices outside the PDC and used to verify access attempts to those services. The user can user configure/modify the permissions documents 122 via the user interface 102.

The RDPDs in the data store 118 describe access permissions associated with device resources, which may also be generally referred to herein as "services." The services may conform to the typical network service paradigm (e.g., Web server, email server, application server, file server, music server, image server, video server, game server, streaming of audio/video, etc.), may represent other resources such as files/data (e.g. music, video, games, image, etc.), or may represent access and controlling to applications and devices (such as sensor devices, home automation, industrial automation, etc.). These services may be described in a Service Mapping Document (SMD) that includes XML service description of the computing resources. The device 101 may include an SMD module 126 that stores, retrieves, creates, and otherwise manages one or more service description documents 128. The device 101 may also include a security module 130 that centrally manages aspects of security for the other functional modules 102, 110, 118, 126. The security module 130 may perform authentication, encryption, access permissions to local resources, runtime integrity checking of module operations, etc.

The illustrated architecture 100 provides for secure service discovery between different PDCs, and allows replication of the secure service discovery data between devices within each PDC. Although many variations are possible, an example of the discovery process is described below in four different steps. These steps include:

Step 1—Resource Registration. This is the process of creating an RDR. It may be triggered by some external event, such as a new service being installed by the user, a new device being added to the PDC, a new contact being added to a device/PDC, etc. or it may be triggered manually. The resource registration can be further divided in two sub-steps: (a) creation of an RDR, (b) propagation of the RDR among all the user's Personal Devices Cluster (PDC) devices. A more detailed description of these sub-steps are provided further below.

Step 2—Setting Discovery Permissions. The process where the user specifies which RDRs may be propagated to other users' PDC devices. Generally the user will explicitly specify which contacts may have access to PDC resources, and all others will be excluded by default. These permissions may be replicated to all devices within a PDC, even when the permissions do not affect those devices.

Step 3—Resource Discovery/Browsing. The process whereby a user discovers resources in his/her own PDC and in other users' PDCs. When discovering another user's PDC resources, this step will decide how one user's RDRs propagate to the other user's PDC devices. This step also defines how the RDRs are visualized by the users.

Step 4—Service Launching. This involves utilizing the RDRs corresponding to services to launch (a potentially customized view of) a client-side application that accesses the remote user's server-side distributed service. Remote users may be authenticated per the discovery/access permissions, and may be limited to what resources are made available. These access limitations may be enforced by the discovery architecture and/or by the services themselves.

These steps are further explained below. Note that the architecture elements described in relation to FIG. 1 (or equivalents thereof) are part of the resource discovery mechanism. Relevant parts of the architecture 100 may be installed in all devices utilizing the service discovery/invocation described below. Signaling diagrams illustrating the Steps 1-4 described above are depicted in FIGS. 2-5. In reference now to FIG. 2, a block diagram illustrates communications between devices of a PDC 200 according to an embodiment of the invention. In particular, the communications shown in FIG. 2 enable resource registrations of devices 202, 204, 206 that are part of the PDC 200. It will be appreciated that the PDC 200 may contain any number of devices, as indicated by the label "PDC $A_N$" for PDC 206.

The devices 202, 204, 206 each include respective secure resource discovery modules 208, 210, 212 and PDC stores 214, 216, 218 such as described in relation to FIG. 1. The devices 202, 204, 206 may be coupled by a network or similar data transfer interfaces (e.g., Bluetooth, Universal Serial Bus, IEEE 1384, etc.). The individual modules 208, 210, 212, 214, 216, 218 may be network capable, and may be able to communicate with each other and with other devices of the PDC 200 using these technologies. The modules 208, 210, 212, 214, 216, 218 (as well as any modules described in relation to FIG. 1) may also communicate within a particular device using non-networking inter-process communications (IPC), such as provided by an operating system (OS) or system middleware. Example IPC technologies include OS messaging passing, pipes, shared memory, synchronization, Microsoft™ Component Object Model (COM), CORBA™, Java™ Remote Method Invocation (RMI), Remote Procedure Call (RPC), etc.

Figure 2:
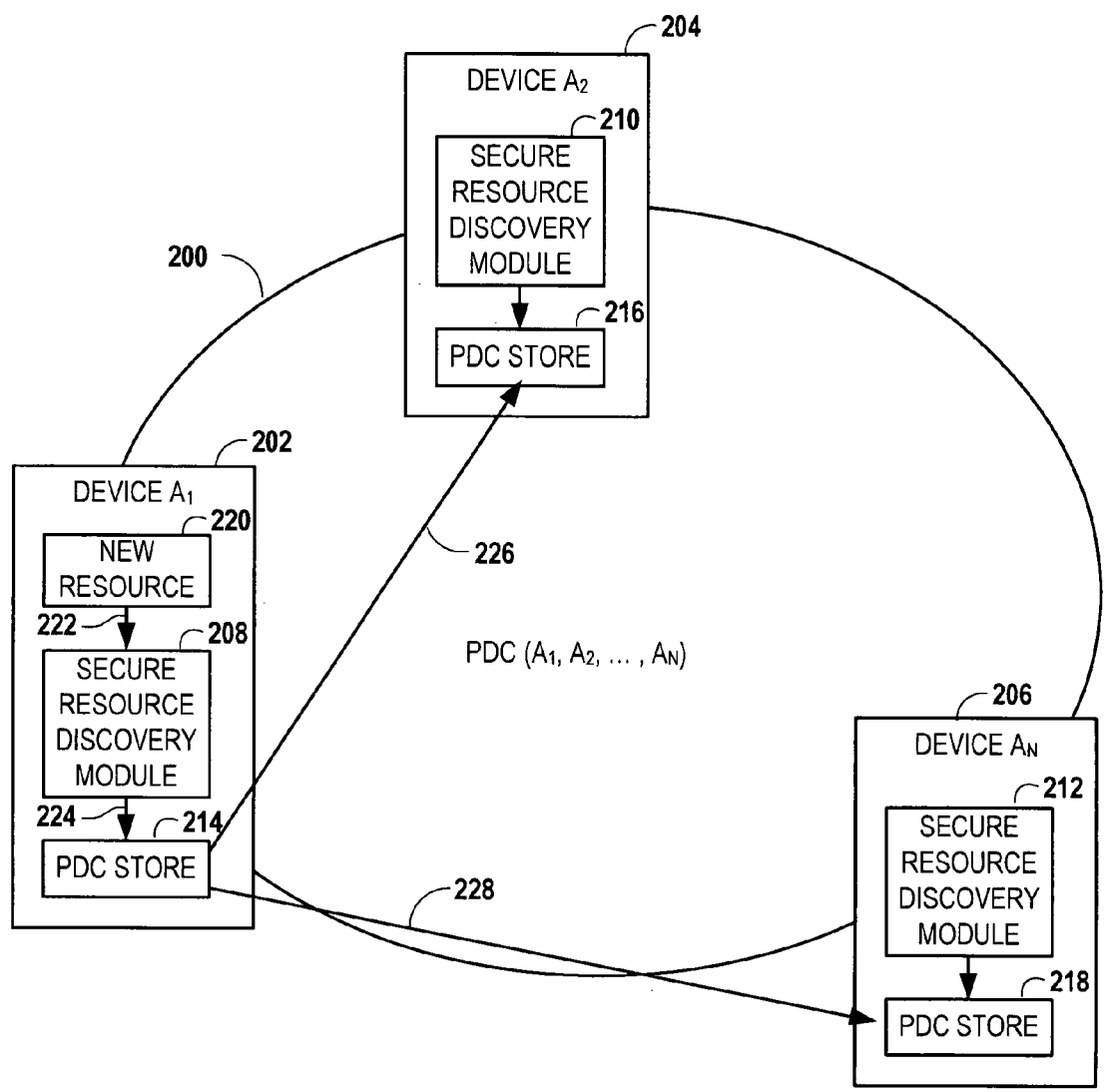
FIG. 2 is a block diagram illustrating interactions between devices of a personal device cluster according to an embodiment of the invention.

In the resource registration scenario shown in FIG. 2, describing one embodiment of the invention, a new resource 220 is created on device 202. The resource 220 may be installed together with a corresponding XML service description document by a server-side installer/launcher (e.g., installer/launcher 116 in FIG. 1), which thereafter launches the service (or otherwise facilitates access to the resource 220). The event is registered 222 with the local secure resource discovery module 208. The secure resource discovery module 208 creates a corresponding Resource Discovery Record (RDR) and records 224 this information in the local PDC store 214.

The replication mechanism of the PDC store 214 on device 212 sends the new RDR to the PDC stores of all other devices of the PDC, as represented by communications 226, 228 to resource discovery modules 216, 218 of respective devices 204, 206. The communications 226, 228 may be made by individual connections to individual devices 204, 206, or may be made partially or completely via broadcast or multicast of the data 226, 228 via a network.

Figure 6:
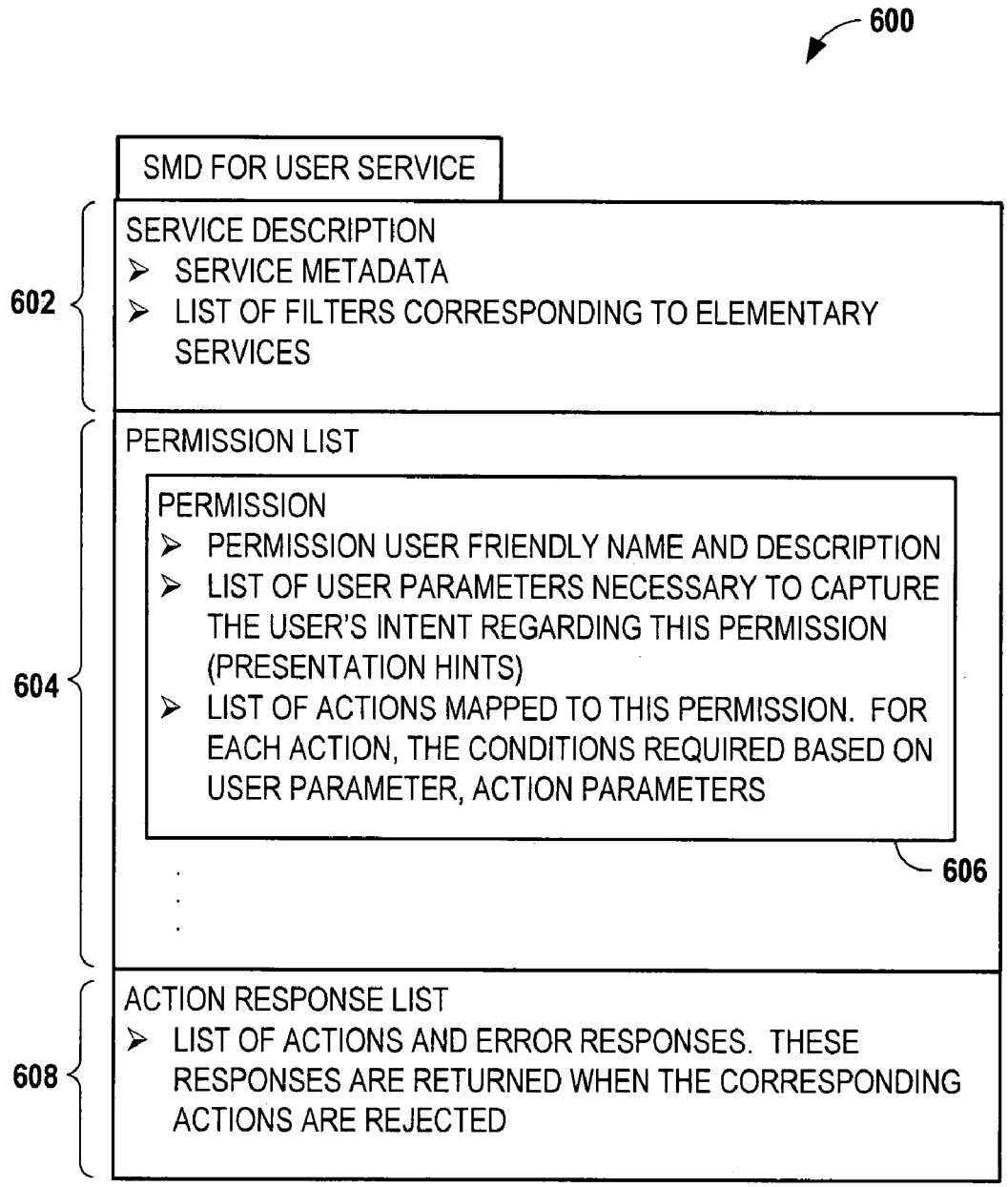
FIG. 6 is a block diagram illustrating a service mapping document data structure according to an embodiment of the invention.

For each of the respective devices 202, 204, 206 and contacts, the secure resource discovery modules 214, 216, 218 create RDRs based on information entered by the user as he/she introduces them to his/her PDC. Access to distributed services and content exposed by the secure resource discovery modules 214, 216, 218, may be provided by a server-side installer/launcher (e.g., installer/launcher 116 in FIG. 1). While installing a distributed service (e.g., represented by event 222), the server-side installer/launcher also installs an XML service description document, which may be part of a document called Service Mapping Document (SMD) (an example of an SMD is shown in FIG. 6). The server-side installer/launcher creates an RDR for the distributed service, and saves 224 the RDR to the local PDC-store 214. The server-side installer/launcher can thereafter launch the distributed service, either automatically (e.g., via an internal trigger or external request) or on demand (e.g., by explicit user request).

The PDC stores 214, 216, 218 together act as a distributed repository of information that securely replicates its contents among all devices of the user's PDC 200. The devices 202, 204, 206 in the same PDC 200 have access to this functionality, and devices outside the PDC 200 may be partially or wholly restricted from viewing or accessing the PDC stores 214, 216, 218. The devices 202, 204, 206 in the user's PDC 200 receive the RDRs of devices, services, content, and contacts owned by this user through the PDC-store replication mechanism.

Figure 3:
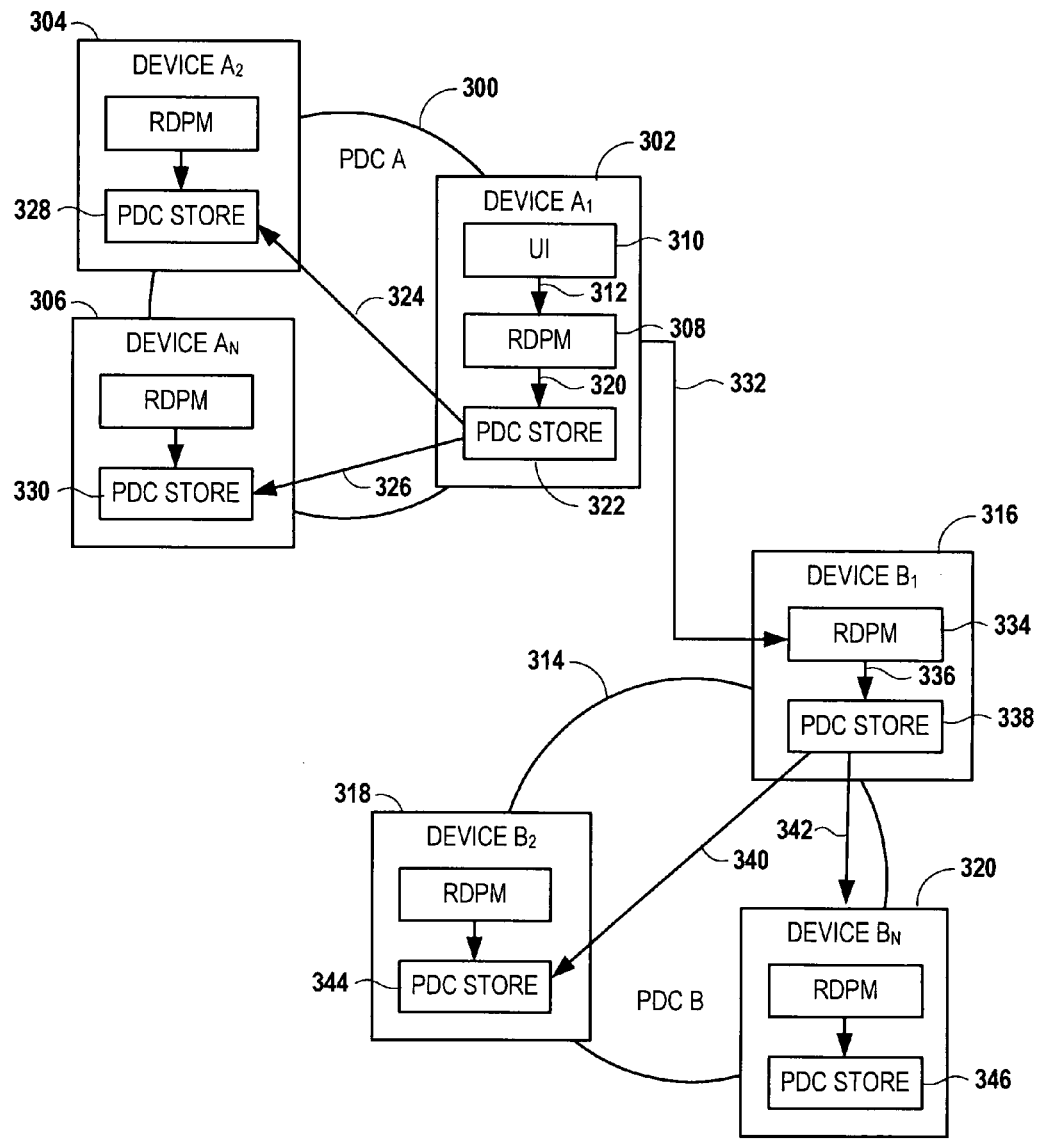
FIGS. 3-5 is a block diagrams illustrating interactions between devices of two different personal device clusters according to embodiments of the invention.

In reference now to FIG. 3, a block diagram illustrates the communication of PDC resources to other devices outside the PDC according to embodiments of the invention. This involves a user tool called Resource Discovery Permissions Manager (RDPM) that allows the user to create one or more Resource Discovery Permission Documents (RDPD). The RDPD specifies which of the user's own RDRs may be revealed to another user. The RDPM creates and stores the RDPDs in the local PDC-store, which then replicates them across all PDC devices as mentioned above. Additionally, the RDPM may send the RDPD to the RDPM of a device in that other user's PDC, which stores it in its own PDC-store, which in turn propagates it across all devices in that other user's PDC.

In the illustrated example, a first PDC 300 has devices 302, 304, 306. The user/owner of device 302 operates a RDPM 308 by way of a user interface 310. In particular, the user instructs 312 the RDPM 308 to create a RDPD that defines which RDRs of PDC 300 can be accessed by devices of another user/owner. In this example, the other user/owner is associated with PDC 314, which includes devices 316, 318, and 320.

In response to the first user's creation 312 of the RDPD, the RDPM 308 of device 302 stores 320 the newly created RDPD in its local PDC-store 322. The replication mechanism of the PDC store 322 on device 312 and sends 324, 326 the newly created RDPD to the PDC-stores 328, 330 to devices 304, 306, as well as to any other devices in PDC 300. In addition, in response to the user creation 312 of the RDPD, the RDPM 308 of device 302 sends 332 the newly created RDPD to the RDPM of any of the devices of PDC 314, e.g. RDPM 334 of device 316. The RDPM 334 stores 336 the received RDPD in its local PDC store 338. The replication mechanism used by the PDC store 338 sends 340, 342 the received RDPD to the PDC stores 344, 346 of devices 318, 320, as well as any other devices within PDC 314.

Figure 4:
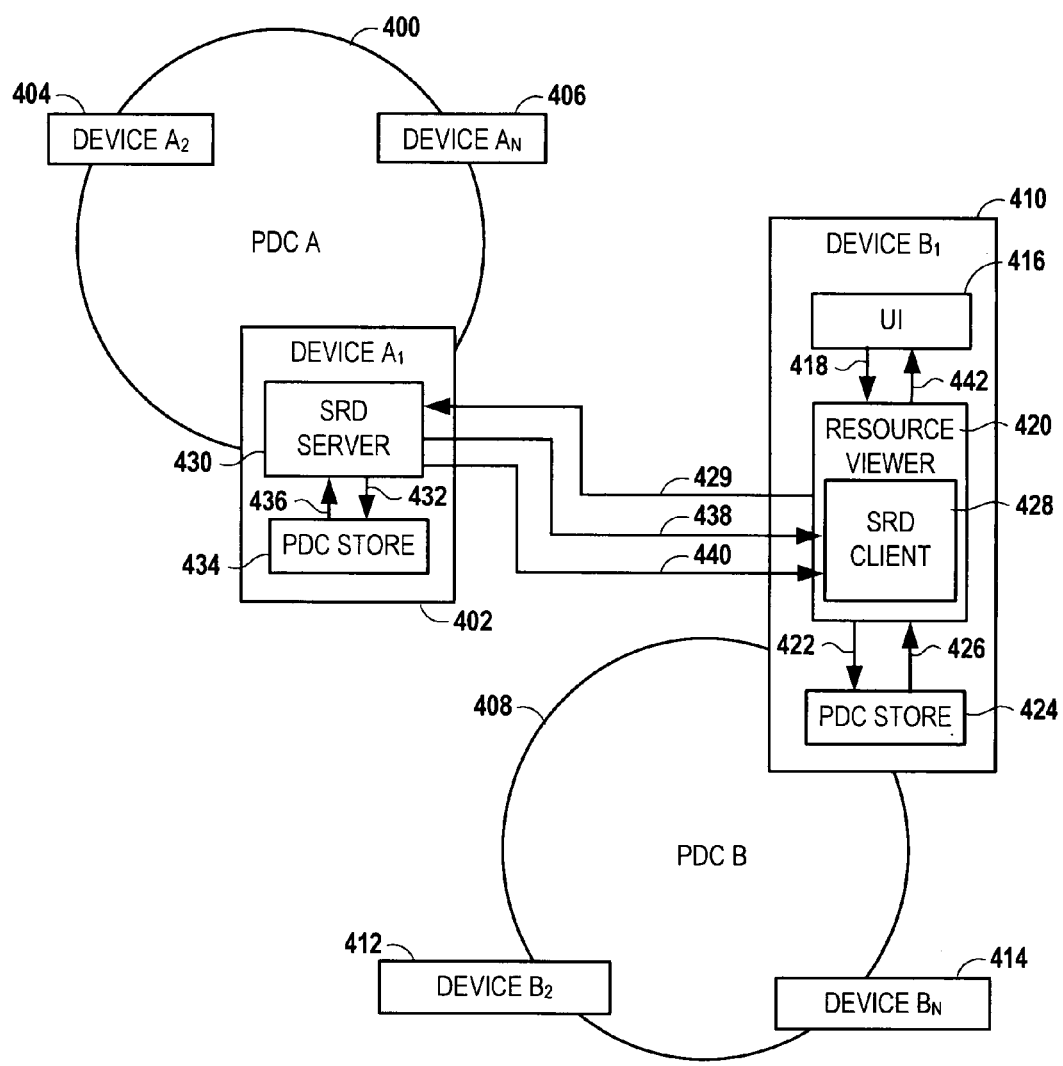

In reference now to FIG. 4, an example is illustrated of resource discovery and browsing according to an embodiment of the invention. Generally, devices in a user's own PDC receive the RDRs of devices, services, content, and contacts owned by this user through the PDC-store replication mechanism. In order to discover RDRs belonging to another user, this example describes a Secure Resource Discovery client (SRD-client) and a Secure Resource Discovery server (SRD-server) in each device, similar to SRD client 108 and SRD server 112 shown in FIG. 1. This example also introduces a Resource Viewer (RV) User Interface (UI) tool (e.g., similar to resource viewer 106 shown in FIG. 1) which reads information contained in the RDRs and depicts the corresponding resources in a user-meaningful way. The SRD-client is part of the RV tool. When a user attempts to see what resources are owned by another user, the SRD-client sends a request that is received by the SRD-server on one of the devices of that other user's PDC. The SRD-server authenticates the user and then looks in its PDC-store for an RDPD describing which RDRs can be returned to the requesting user, and returns only these or none if no RDPD is found for that user.

In FIG. 4, a first user is associated with PDC 400, which includes devices 402, 404, and 406. A second user is associated with PDC 408, which includes devices 410, 412, and 414. Device 410 includes user interface hardware 416, that may be used by the user of PDC 408 to view available resources. The user interface 416 may signal 418 to a resource viewer (RV) 420 of device 410 that this view is requested. In response, the RV 420 requests 422 all local RDRs from a local PDC store 424. The PDC store 424 replies 426 with local RDRs. The RV 420 includes an SRD client 428, which sends a network request 429 for RDRs to the SRD-server of any device in PDC 400, e.g. SRD server 430 in device 402.

The SRD server 430 of device 402 requests 432 from the local PDC-store 434 the RDPD specifying which access the user/owner of PDC 408 has. If an RDPD for user/owner of PDC 408 exists, the PDC store 434 returns it 436 to the SRC-server 430. If no RDPD exists, the SRD server 430 returns no RDRs to the SRD-client 428 and terminates the process. However, if the RDPD was returned 436 by the PDC store 434, the SRD server 430 authenticates 438 with the SRD client 428 to ensure that device 410 is indeed part of PDC 408.

The authentication 438 may be performed by any mechanism known in the art. For example, the RDPD 436 may include the public key corresponding to the user whose access it specifies. When the SRD-client 428 sends the discovery request 429 on behalf of that user, the SRD-server 430 asks for public key of the requesting user in order to match it with that specified in the RDPD 436, and then uses standard PKI challenge-response mechanism to authenticate that the requesting device 410 indeed is in possession of that user's private key, i.e. it belongs to that user.

Figure 5:
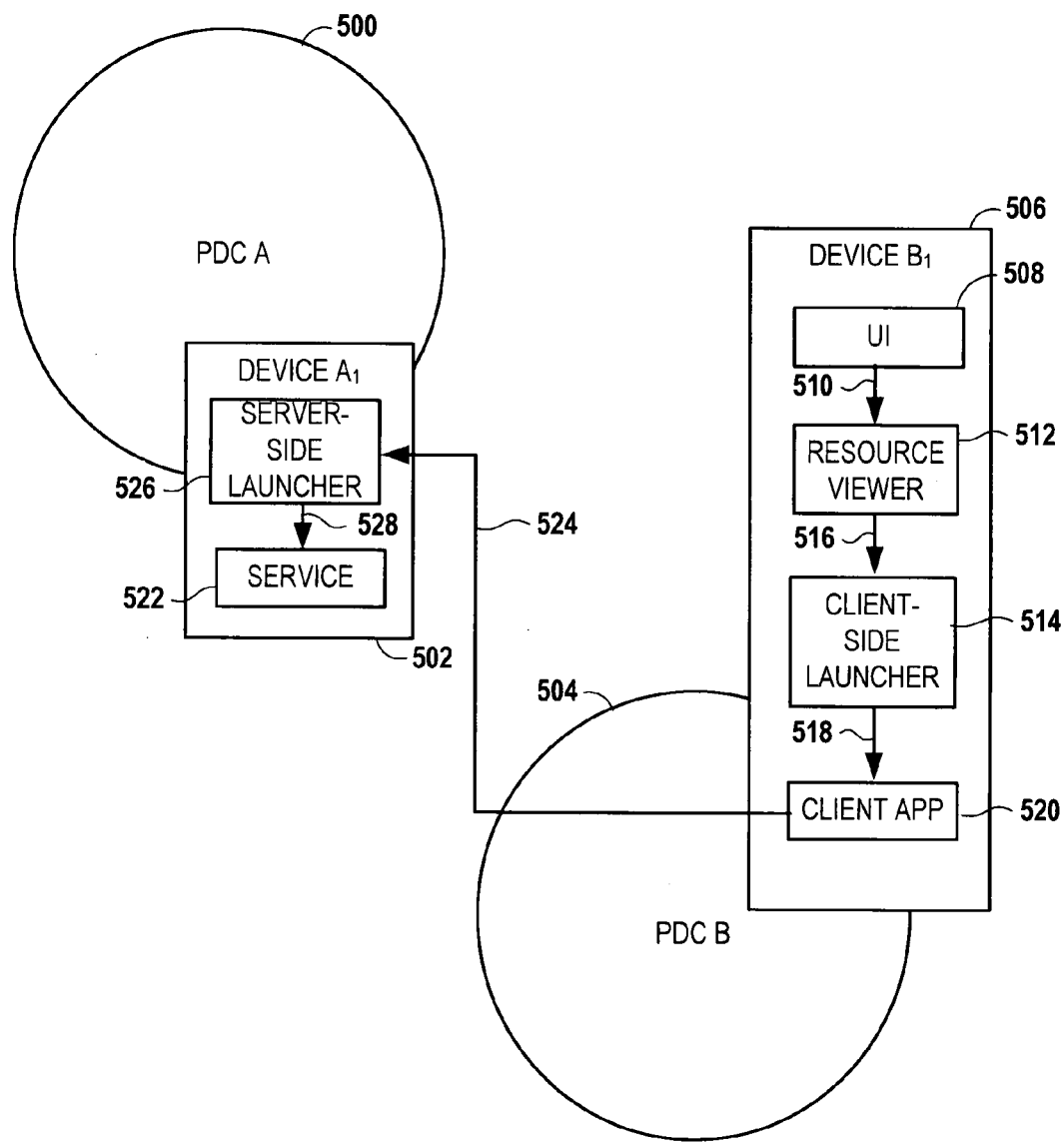

If authentication 438 succeeds, the SRD-server 430 replies 440 to the SRD-client 420 with any RDRs that user/owner of PDC 400 is permitted to access. The RV 420 of device 410 displays 442 to the user all retrieved RDRs 440, 426 in a user-meaningful representation. Thereafter, the user may use the user interface 416 of the device 410 to access the resources exposed by way of the RDRs 440, 426. In order to launch discovered services, the a client-side launcher of distributed services may be used. FIG. 5 shows an example procedure of launching discovered services according to an embodiment of the invention. A PDC 500 includes serving device 502, and PDC 504 includes access device 506. The user, by way of user interface 508, selects 510 a service RDR via an RV 512 of device 506. In response to this selection 510, a client-side launcher 514 is activated 516. The activation 516 includes passing information to the client-side launcher 514 regarding the RDR that was selected.

The client-side launcher 514 analyzes the RDR to figure out which client-side application 520 to launch 518 in order to access 524 the corresponding service 522 of other user's device 502. Furthermore, the client-side launcher 514 may also access the RDPD received from that other user in order to "customize" the launching of the client-side application 520, to create a view of only the allowed aspects of the remote service 522. In another embodiment, in order to discover RDRs belonging to another user, this example describes a Secure Resource Discovery client (SRD-client) and a Secure Resource Discovery server (SRD-server) in each device, similar to SRD client 428 and SRD server 430 shown in FIG. 4. The SRD-client may be part of the RV too 420. When a user attempts to see what resources are owned by another user, the SRD-client may access the one or more RDPD received from that other user's PDC 400 (e.g. device 402) in order to create a view of only the allowed aspects of the remote service 522 in the RV 420, and to "customize" the launching of the client-side application 520 to show only services that are available for the user in the other user's PDC. In this case the RDPD may include additionally information how the available services could be presented and how and where the related RDRs are available. Further, the device 402 may offer access directly without checking the local RDPD documents, or alternatively the device 402 may do an additional access right check before replying 440 with the relevant RDRs. In this embodiment, the RDPD may be sent also before and/or separate of sending any RDRs.

The service providing device 502 may receive the access request 524 via the corresponding service 522, or as shown in FIG. 5, via a server side launcher 526. The server side launcher 526 may be able access an RDPD associated with the requested service 522, determine whether access to the service 522 is authorized by device 506 and/or PDC 504. The RDPD might also have other restrictions/requirements related to the access of service 522 by device 506 and/or PDC 504. These restrictions/requirements may also be used to customize the launching 528 of the service 522 in response to the request 524.

As described in various examples above, each device may belong to a user's personal network, also called Personal Device Cluster (PDC). The PDC may include any manner of computing devices, each responsible for creating a discovery record. The discovery records may describer the distributed services hosted by the particular device, the device itself, and each user that this device may be introduced to (also referred to as contact). Note that discovery records referring to content are also possible under this invention, but may not be always necessary in cases where content is exposed by one of the distributed services and can be discovered through them. In that case, the services themselves can handle finer granularity discovery and access of individual content objects.

Devices according to embodiments of the invention incorporate a mechanism that allows them to selectively reveal a subset of these discovery records in response to inquiries sent by devices belonging to other users. Which discovery records are revealed is controlled by the user, who specifies resource discovery permissions about which records can be revealed to each of the users in his/her social network. These resource discovery permissions are created by the user via a software tool proposed by this invention called Resource Discovery Permissions manager (RDP manager) on any of his/her devices. In order to do this, the user uses any of the devices in his/her PDC to launch the RDP manager user tool. This tool has access to all records in the local PDC-store and can create a resource discovery permissions document that marks which resource discovery records can be revealed to a specific user. In this way, the user can customize individually the visibility that others have to his/her personal resources, e.g. based on a level of trust towards the recipient. After creating a resource discovery permissions document, the device then saves it in the local PDC-store and the replication mechanism replicates it among all devices in the user's PDC.

In a particular implementation of the invention, referred to as MyNet, the resources are described in MyNet records. The contents of MyNet records are specific to the type of resource. Particular fields of a resource MyNet record are:
- a unique record_id
- a unique resource id (e.g. device_id, service_id, user_id)
- a resource type (e.g. device, service, user)
- a resource subtype (e.g. laptop, phone, PDA)
- a resource friendly name (e.g. my_laptop, content browser, John)
- a resource icon (e.g. laptop.jpg)

For the case of services additional fields may include:
- service discovery protocol
- service discovery protocol version
- service discovery transport protocol
- service discovery transport protocol version
- service discovery network transport protocol
- service discovery network transport protocol version
- service discovery network transport protocol port A service record may also include a list of elementary services that make up the service with their individual invocation, transport and network protocols and ports. The information necessary to create each service record is described in a Service Mapping Document (SMD). Embodiments of the invention may use an installation process whereby SMDs are used describe the distributed services through which resources (services, content, contacts) are shared. The SMDs may be installed simultaneously, but independently, from the software that implements the associated services. The general structure of which is shown in FIG. 6.

In FIG. 6, a block diagram illustrates an example of data that may be included with an SMD 600 according to an embodiment of the invention. The SMD 600 may include a service description section 602 that contains user-level metadata. This service metadata 602 may give enough information so that the users can visualize and understand the basic usage of the described services when they discover them over the P2P social network. The service metadata 602 may also include SMD filters. The SMD filter is a hierarchical stack of known protocol layers, starting from layer 1 (IP layer) and ending on the highest layer that is required by the firewall to unambiguously demultiplex incoming traffic into the appropriate Captured traffic unit (CTU). For example, a MyNet firewall may inspect all incoming traffic and processes the list of SMD filters in order until it finds the first filter that matches it. Each unit of incoming traffic may captured by one SMD filter, with the MyNet Default capturing all traffic not captured by any of the remaining SMD filters.

In the context of MyNet, the information necessary to describe a shared resource in XML form is included in a MyNet Service Description section. An example representation of a MyNet Service Description is shown in TABLE 1 below.

TABLE 1

```
<mynet_service_description>
    <mynet_service_metadata>
        <mynet_service_id>
            a unique MyNet service ID
        </mynet_service_id>
        <mynet_service_version >
                MyNet service version
        </mynet_service_version>
        <mynet_service_type>
                the service category this service belongs to
        </mynet_service_type>
        <mynet_service_friendly_name>
                a friendly name for this MyNet service
        </mynet_service_friendly_name>
        <mynet_service_friendly_description >
                a more extended user-friendly description of this
service
        </mynet_service_friendly_description>
        <!-- This is metadata about the distributed framework
        on which the service is implemented -->
        <mynet_service_framework>
                e.g. UPnP or other distributed computing
framework
        </mynet_service_framework>
        <mynet_service_framework_version >
            framework version
        </mynet_service_framework_version>
    </mynet_service_metadata>
    <!-- This is the list of underlying elementary services
that
            implement the high-level NyNet service.
            An SMD filter is associated to each of these
elementary
            services.    -->
    <elementary_service_list>
        <elservice>
                <!--      -->
            <smd_fIter_id>
                unique filter ID for this elementary service
            </smd_filter_id>
            <service_id>
                the service ID used by the distributed computing
                framework to distinguish this service
            </serviceid>
            <service_invocation_protocol>
                e.g. SOAP, XM L-RPC
            </service_invocation_protocol>
            <service_invocation_protocol_version >
                version
            </service_invocation_protocol_version>
            <service_transport_protocol>
                e.g. HTTP, SSDP
            </service_transport_protocol>
            <service_transport_protocol_version>
                version
            </service_transport_protocol_version>
                <network_transport_protocol >
            e.g. TCP, UDP
            </network_transport_protocol>
                <network_transport_protocol_version>
            this is 6.0 for UIA_IPv6 traffic
            </network_transport_protocol_version>
            <network_transport_protocol_port>
                port number the server is listening to
            </network_transport_protocol_port>
            <network_protocol>
                this is UIA_IPv6
            </network_protocol>
        </elservice>
        <elservice>
            Other elementary service here
        </elservice>
    </elementary_service_list>
</mynet_service_description>
© 2007 Nokia Inc.
```

The SMD 600 may also include a permission list 604 that includes one or more permissions 606 associated with one or more actions of the service. Each permission 606 may describe, for one or more user, actions that may or may not be performed by a user. The actions allow client-side devices to launch the client-side applications to access the discovered distributed services. The permissions 606 may be associated with any combination of user identities, devices, and/or PDC.

The SMD 606 may also contain a list 608 of action responses that may be associated with the service and/or permissions 604. These actions 608 may define responses that are returned in cases where the corresponding actions are rejected. Once the software implementing the service and its SMD 600 are installed in a device, a launcher component of the device the server-side of the distributed service, either automatically or manually (e.g., following a user initiated request). Upon launching the server-side of the service, the launcher accesses the service description information in the corresponding SMD 600 and creates a service discovery record for it.

Each service is installed together with its SMD document by the MyNet Service Installer module. Upon installation, the server-side launcher component of MyNet Secure Resource Discovery (SRD) takes the following steps: launches the server part of the service, accesses the SMD document and retrieves the service description information. This is used by the MyNet SRD module in order to create a MyNet service record for the newly installed service. MyNet service records are stored in the local device PDC-store. The PDC-store is then replicated across all devices in the personal network by the MyNet replication mechanism, so that all records are available in all local PDC-stores. The MyNet replication mechanism operates over the same P2P network infrastructure that is used to exchange other user data.

The user interface in each device has a 'resource viewer' component (e.g., resource viewer 106 in FIG. 1), which uses the information in each resource discovery record to create meaningful depictions of the discovered resources (contacts, devices, services, content) and communicate them to the user. The resource viewer allows, for example, the user to see all resources known to all devices in his/her PDC. This is done because the resource viewer has access to the local PDC-store, which contains all corresponding discovery records. Furthermore, the 'resource viewer' component of the UI can be used to view resources in another user's PDC. This is done by sending a discovery request to any device in that other PDC and displaying the discovery records received as a response, as described in greater detail in relation to FIG. 4.

Figure 7:
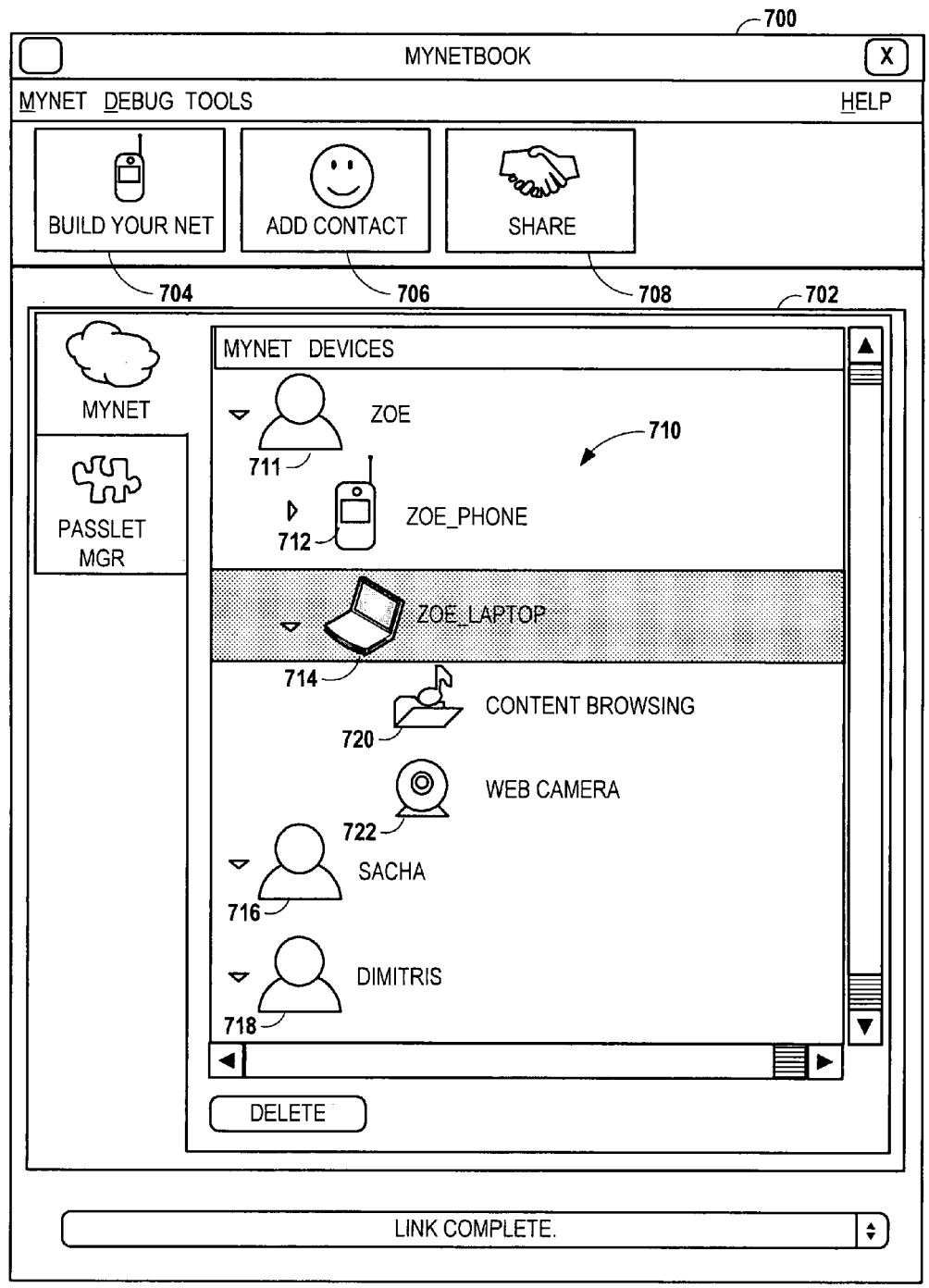
FIGS. 7-11 are block diagrams illustrating user interfaces according to embodiments of the invention.

In the MyNet implementation, the resource viewer component is referred to as MyNetBook. MyNetBook is the GUI interface of MyNet and can run on a MyNet-enabled device with a display. MyNetBook provides a number of tools that expose MyNet functionality to the end user. The MyNet tools are described hereinbelow in reference to FIGS. 7-11, which are block diagrams depicting user interfaces according to embodiments of the inventions. In reference first to FIG. 7, the MyNetBook resource browsing tool 700 is shown. The tool 700 includes a viewing pane 702 that visualizes various resources discovered and accessible to the user. Other controls include a network configuration control 704 that allows the user to specify various network and application layer settings of the application, such as network interfaces, media, addresses, protocols, P2P access mechanisms, encryption, etc., that relate to the underlying connectivity used for service discovery and other network functions. An "add contact" control 706 allows the user to add new contacts, both for purposes of sharing content with that contact and for accessing content offered by that contact. A sharing control 708 manages aspects of sharing content, including global settings and contact specific settings.

When the tool 700 is first launched, service records are retrieved from the local PDC-store in order to create meaningful descriptions of the devices and services for the end-user. In the example implementation, the browsing tool 700 visualizes the resources in a hierarchical tree structure 710. All the devices owned by a user are logically grouped together. Likewise, all services hosted by a device are logically grouped together. The MyNetBook tool 700 is able to present all the devices, services and contacts in the personal network on any personal network device using the information from the local PDC-store. For example, in FIG. 7, Zoe (represented by icon 711) has a personal network with two devices, a laptop and a mobile phone represented by icons 712, 714, and has two contacts Sacha and Dimitris, represented by icons 716, 718. She can browse her laptop's services (represented by icons 720, 722) from the MyNetBook application running on her mobile phone.

The end-user can launch a service by double-clicking on the service representation, e.g. icon 722. This causes the MyNet Secure Resource Discovery module (e.g., module 108 in FIG. 1) to take the following steps: (a) match the service ID from the service record to the appropriate client application installed locally (e.g. web camera viewer) and (b) use a client-side launcher component to launch the client application with the corresponding configuration so that it points to the local or remote distributed service (e.g. web camera server on the laptop).

Besides browsing for other content, the user may also wish to share content with others. As previously described, the contact and sharing controls 706, 708 can control some aspects of this. Further, the viewing pane 702 includes a tabbed control 724 that may provide access to a "passlet manager," also described herein as a Resource Discovery Permissions Manager (e.g., RDPM 104 in FIG. 1). The RDPM tool uses the records in the PDC-store to compile a complete list of all the resources in a PDC and enable the end-user to select which personal network resources (i.e. resource discovery records) can be discovered by other users. In other words, the end user can customize the view that other users have of his/her personal network. An example of this tool is shown in the user interface 800 of FIG. 8.

Figure 8:
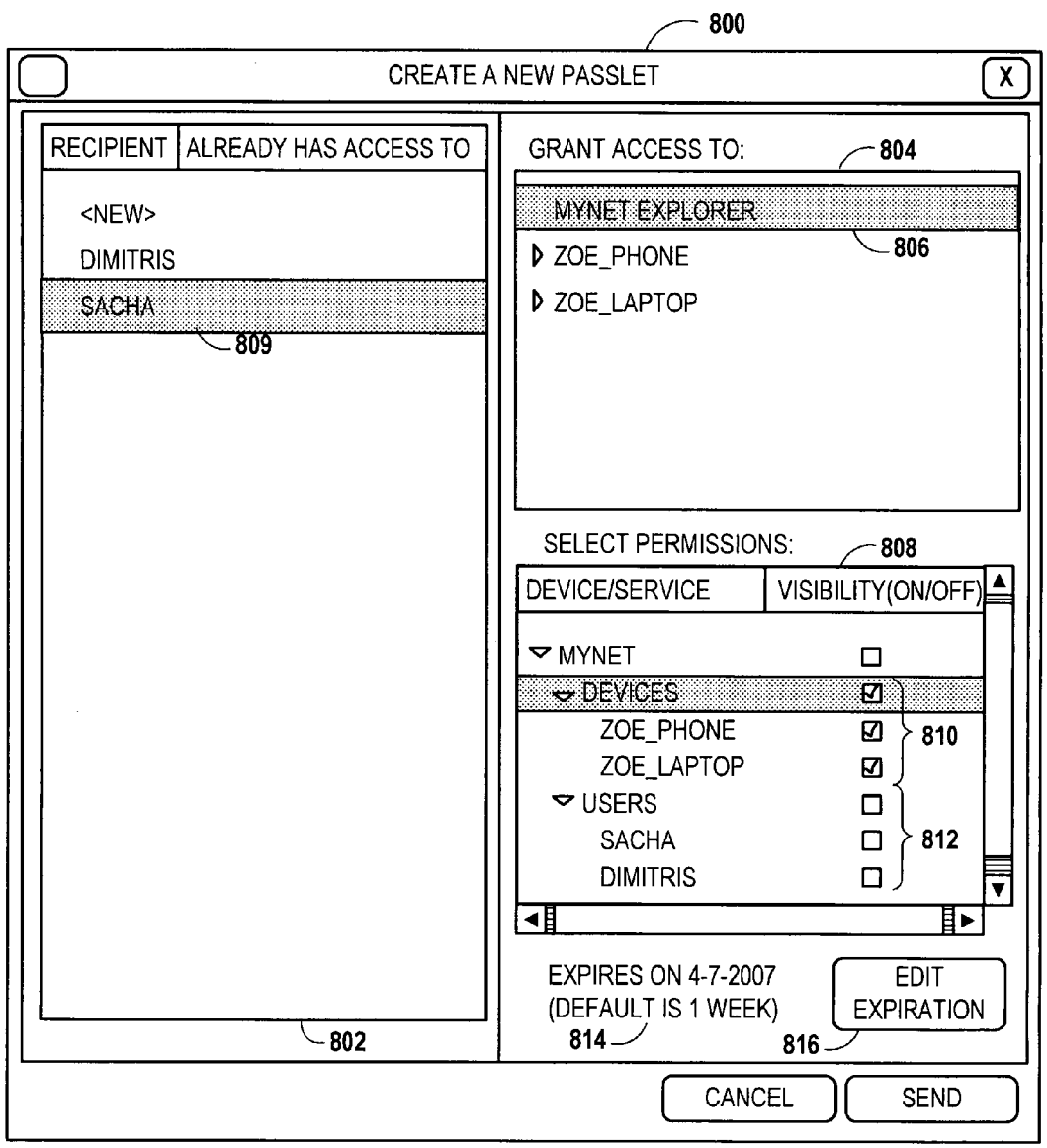

The permissions management tool 800 includes a pane 802 for listing contacts. Pane 804 allows designating particular devices within a PDC (or the entire PDC, as indicated by selection 806). Panel 808 allows the user to set permissions for the resource selected in pane 806. In FIG. 8, Zoe has selected 809 that Sacha (who is one of Zoe's contacts) can discover her devices (represented by selections 810) and all their corresponding services. However, as indicated by unselected boxes 812, Zoe has not given permission for Sacha to discover Zoe's contacts. As indicated by text 814 and control 816, these permissions are set by default to expire in a week, and this value can be changed.

Using the Resource Discovery Permissions Manager tool 800, the end-user creates a resource discovery permissions document by marking a set of discovery records, and then the following takes place: (a) the permissions document is stored in the local PDC-store of the issuing device, (b) the local PDC-store is replicated across all devices in the personal network, (c) the resource discovery permissions document is also sent to one of the recipient's devices which stores it in its local PDC-store, and (d) the recipients PDC-store is replicated across his/her personal network, so that all the devices in the recipient's PDC become aware of the new resource discovery permissions document.

Figure 9:
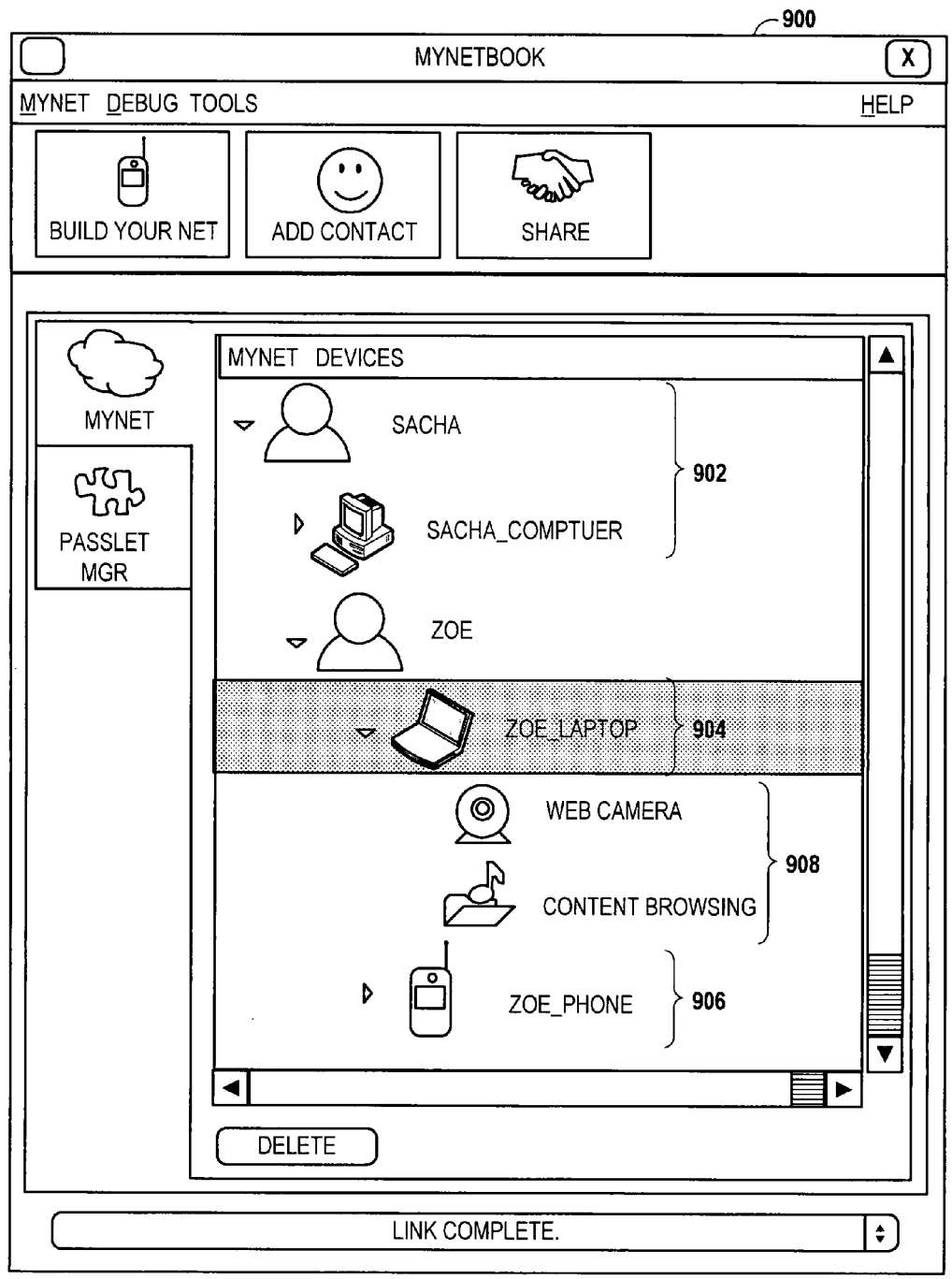
Figure 10:
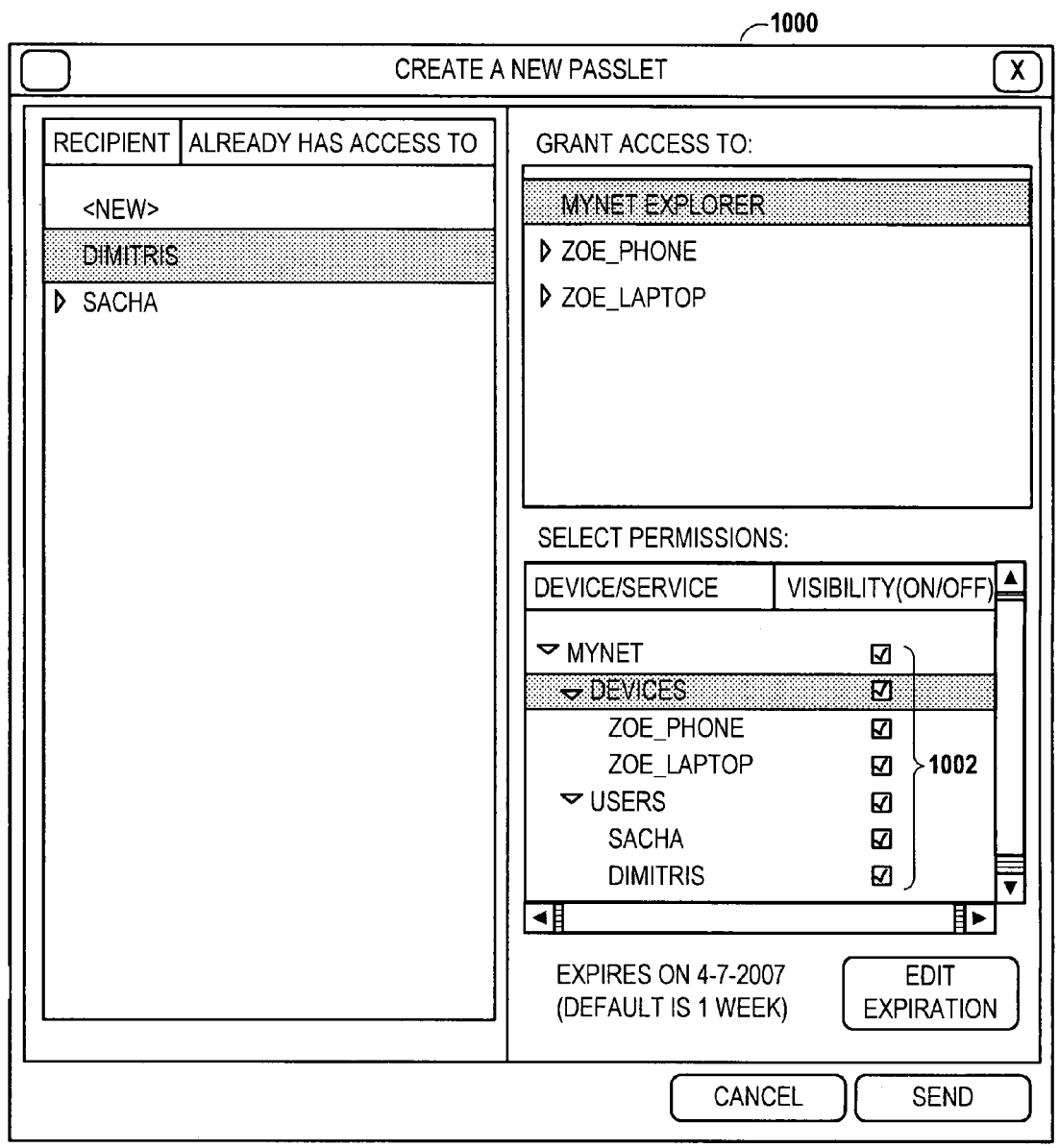
Figure 11:
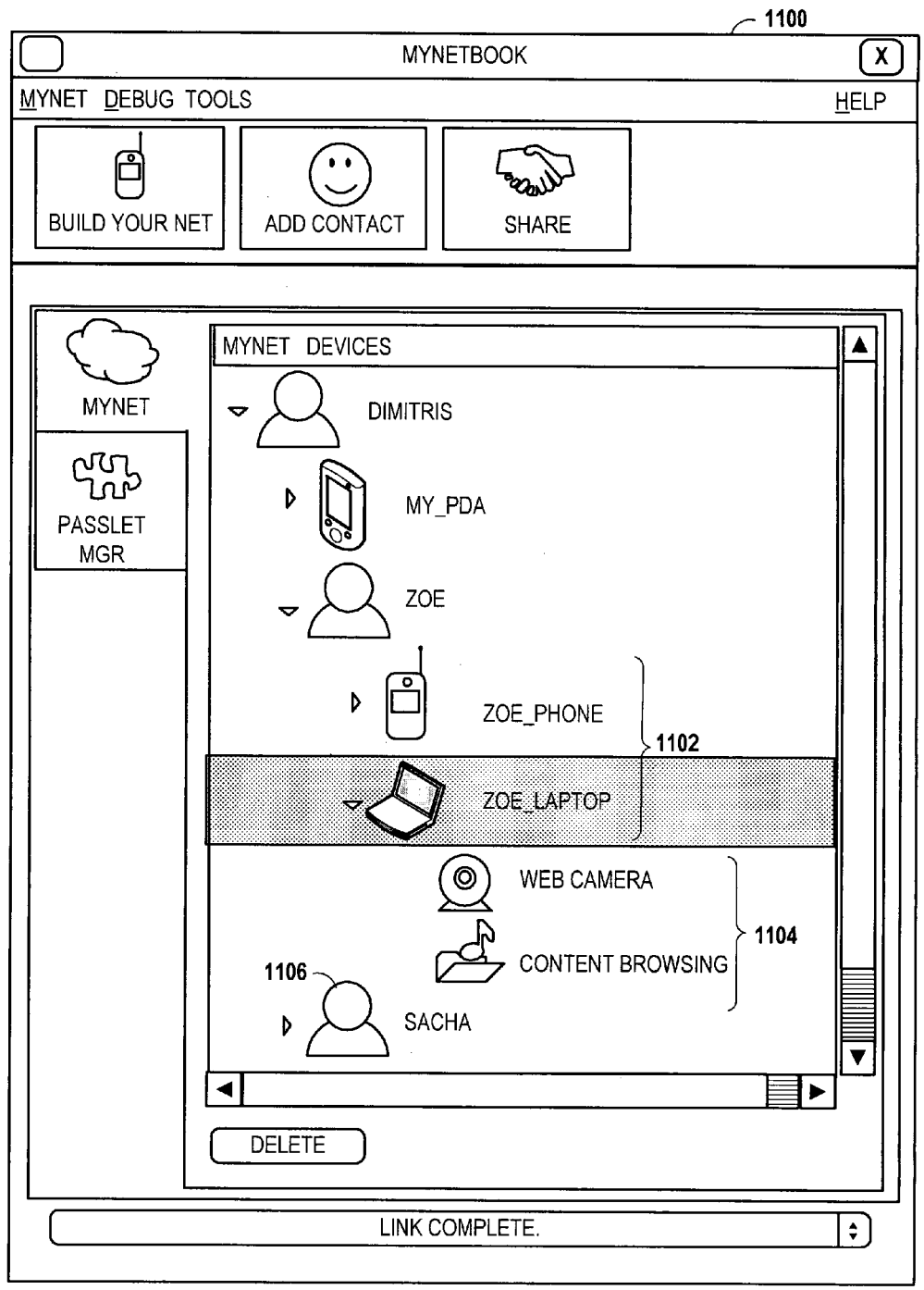

As a result, the MyNetBook module running on the recipient's devices can use information from the received permissions document to customize the view exposed to the user in MyNetBook and match it to the functionality that was authorized. In order to achieve this, MyNetBook sends a resource discovery request using the MyNet Secure Resource Discovery module. Resource discovery requests are received by the server component called the Secure Resource Discovery (SRD) server (e.g., SRD server 112 in FIG. 1). The SRD server first authenticates the user of the requesting device and, if so, sets up a secure channel with the requesting device. Then, the SRD server looks into the PDC-store for the resource discovery permissions document that has been granted to the requesting user and replies with only those records as defined in the permissions document. For example, as a result of the permissions document created in FIG. 8, Sacha sees a MyNetBook screen 900 as shown in FIG. 9. Any of Sacha's devices 902 can discover Zoe's personal devices 904, 906 and their services 908, but not her contacts.

Zoe may create a resource discovery permissions document for her other contact Dimitris that allows him to discover everything in her PDC. This permission setting is shown by selection 1002 in panel 1000 of FIG. 10. As a result, the view of Zoe's resources from any of Dimitris' devices is different. The view of Dimitris' device based on this selection 1002 is shown in MyNetBook panel 1100 in FIG. 11. Zoe's devices 1102 and services 1104 appear as in Sacha's view in FIG. 9. In addition, Zoe's contact, Sacha, is also shown under Zoe's resources as represented by icon 1106. This icon 1106 may allow access to Sacha's resources as well, assuming that Sacha has set permissions so that they can propagate in this way.

MyNetBook may use a combination of information from the SMD documents and records in the PDC-store in order to visualize a set of usage permissions (in contrast to resource discovery permissions mentioned earlier) associated with each service. These are user-level permissions based on the attributes of the service. The user can create a usage permissions document that grants access to one of his/her contacts for a device or service by marking a set of permissions. As a result, the end-user can customize the set of permissions that are exposed to other users. The SRD module running on the recipient's devices can use information from the received usage permissions document when launching the client application, in order to customize the functionality exposed to the end-user and match it to the functionality that was authorized. For example, in FIG. 9, Zoe creates a usage permissions document which grants Sacha access only to her public photos on her laptop, but not her private photos or videos. When Sacha launches on his device the client content browsing application to access Zoe's content browsing service, his view of the service will be customized so that only the public photos will be visible to Sacha.

Figure 12:
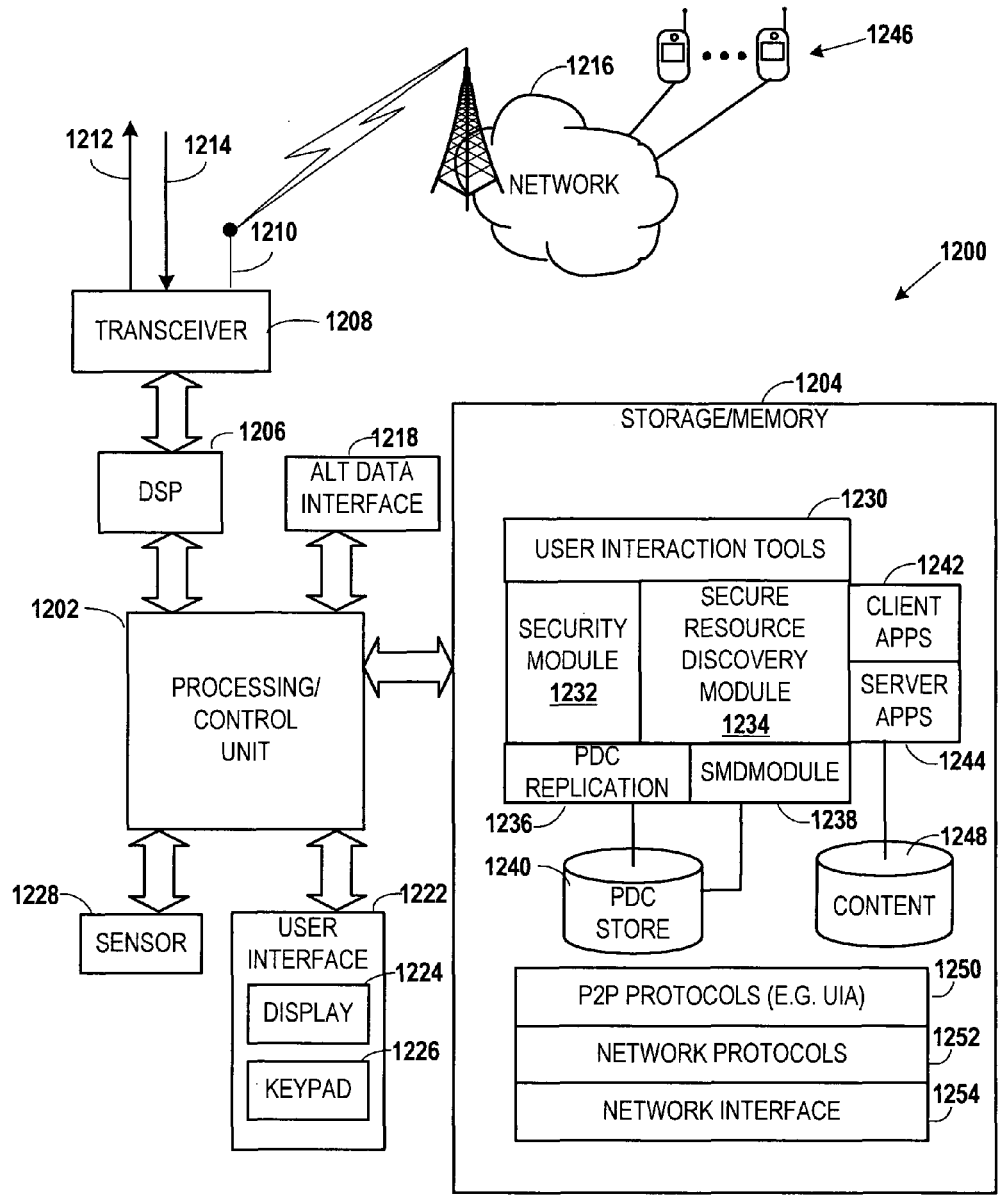
FIG. 12 is block diagram of a mobile computing arrangement according to an embodiment of the invention.

Many types of apparatuses may be able to participate in resource discovery and sharing as described herein. Mobile devices are particularly useful in this role. In reference now to FIG. 12, an example is illustrated of a representative mobile computing arrangement 1200 capable of carrying out operations in accordance with embodiments of the invention. Those skilled in the art will appreciate that the mobile computing arrangement 1200 is merely representative of general functions that may be associated with such mobile devices, and also that landline computing systems similarly include computing circuitry to perform such operations.

The processing unit 1202 controls the basic functions of the arrangement 1200. Those functions associated may be included as instructions stored in a program storage/memory 1204. In one embodiment of the invention, the program modules associated with the storage/memory 1204 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 1200 via data signals, such as being downloaded electronically via one or more networks, such as the Internet and an intermediate wireless network(s).

The mobile computing arrangement 1200 includes hardware and software components coupled to the processing/control unit 1202 for performing network data exchanges. The mobile computing arrangement 1200 may include multiple network interfaces for maintaining any combination of wired or wireless data connections. In particular, the illustrated mobile computing arrangement 1200 includes wireless data transmission circuitry for performing network data exchanges.

This wireless circuitry includes a digital signal processor (DSP) 1206 employed to perform a variety of functions, including analog-to-digital (A/D) conversion, digital-to-analog (D/A) conversion, speech coding/decoding, encryption/decryption, error detection and correction, bit stream translation, filtering, etc. One or more transceivers 1208, generally coupled to one or more antennas 1210, transmits the outgoing radio signals 1212 and receives the incoming radio signals 1214 associated with the wireless device. Further, the mobile computing arrangement 1200 may include one or more digital or audio broadcasting receivers, such as digital audio, such Digital Audio Broadcast (DAB), digital TV, MediaFLO, Digital Video Broadcast-Handheld (DVB-H), Digital Multimedia Broadcast (DMB), Multimedia Broadcast Multicast Service (MBMS), etc.

The incoming and outgoing radio signals 1212, 1214 are used to communicate with a network 1216. The network 1216 may include any voice and data communications infrastructure known in the art, including CDMA, W-CDMA, GSM, EDGE, etc. The network 1216 provides access to traditional landline data infrastructures, including IP networks such as the Internet. The mobile computing arrangement 1200 may also include an alternate network/data interface 1218 capable of accessing the network 1216 and/or a proximity network (not shown). The alternate data interface 1218 may incorporate combinations of I/O and network standards such as USB, Bluetooth, Ethernet, 802.11 Wi-Fi, IRDA, Ultra Wide Band (UWB), Wimax, Wibree, etc.

The processor 1202 is also coupled to user-interface elements 1222 associated with the mobile terminal. The user-interface 1222 of the mobile terminal may include, for example, a display 1224 such as a liquid crystal display. Other user-interface mechanisms may be included in the interface 1222, such as keypads 1226, speakers, microphones, voice commands, switches, touch pad/screen, graphical user interface using a pointing device, trackball, joystick, etc. One or more sensors 1228 may also be coupled to the processor 1202 for purposes such as capturing content. These and other external interface components are coupled to the processor 1202 as is known in the art.

The program storage/memory 1204 includes operating systems and programs for carrying out functions and applications associated with functions on the mobile computing arrangement 1200. The program storage 1204 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 1204 of the mobile computing arrangement 1200 may also include software modules for performing functions according to embodiments of the present invention.

In particular, the program storage/memory 1204 may include any combination of resource sharing components as described in greater detail above in relation to FIG. 1, such as user interaction tools 1230, security module 1232, secure resource discovery module 1234, PDC replication module 1236, SMD module 1238, and PDC store 1240. The memory 1204 also may include client applications 1242 and server applications 1244 that interact with the resource discovery module 1234 for sharing resources with other devices 1246 via the network 1216. The server application 1244 may make local computing resources available such as processing services and/or locally stored/created content 1248.

The functional modules of the arrangement 1200 enable peer-to-peer sharing of resources to selected individuals. As such, the memory 1204 may include one or more P2P protocol stacks 1250 for facilitating P2P communications (e.g., ad-hoc connectivity, service discovery, service utilization). The P2P protocols 1250 may rely on a standard networking protocol stack 1252 for common network protocols such as TCP/IP, UDP/IP, etc. The network protocol stack 1252 in turn utilizes a network interface 1254 for accessing the network(s) 1216. The network interface 1254 may include a combination of hardware and software components, including media access circuitry, drivers, programs, and media access protocol modules.

Figure 13:
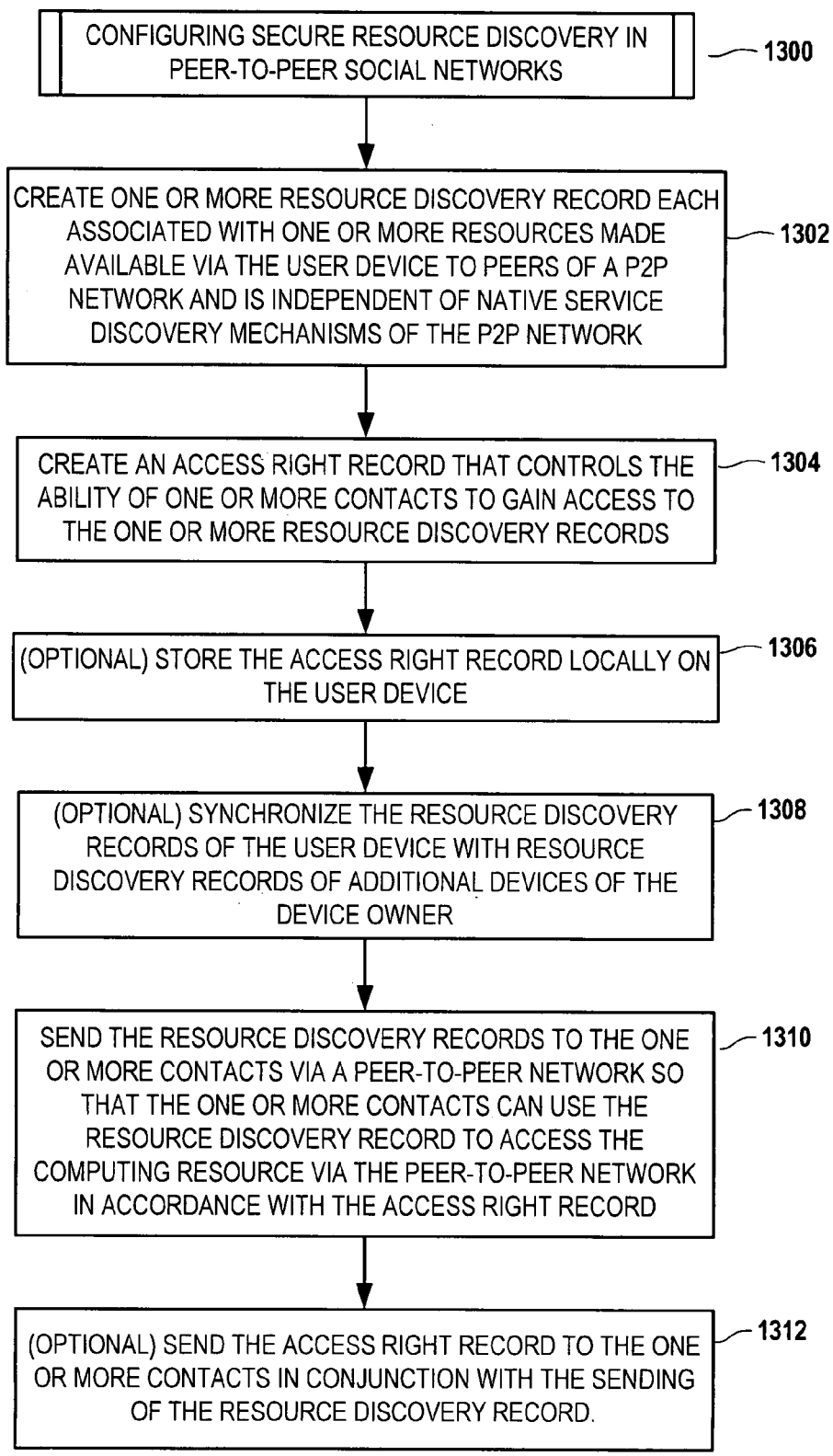
FIGS. 13-16 are flowcharts describing procedures according to embodiments of the invention.

In reference now to FIG. 13, a flowchart illustrates a procedure 1300 for configuring secure resource discovery in P2P networks according to an embodiment of the invention. The procedure 1300 involves creating 1302, via a user device, one or more resource discovery record each associated with one or more resources available via the user device. These records may be created 1302 automatically, such as by the installation of software that provides a shared service, and/or manually, such as via user input.

An access right record is also created 1304 that controls the ability of one or more contacts to gain access to the one or more resource discovery records. The access right record may be stored 1306 locally on the user device. The resource discovery record may optionally be replicated 1308 with records of other devices owned by the creator of the record. The resource discovery records are sent 1310 to the one or more contacts via a peer-to-peer network in accordance with the access right record. The access right record may, for example, limit the devices response to discovery requests based on whether the requester has permissions in the access right record. The one or more contacts can use the resource discovery record to access the computing resource via the peer-to-peer network. The access right record may optionally be sent 1312 to the one or more contacts in conjunction with the sending of the resource discovery record.

Figure 14:
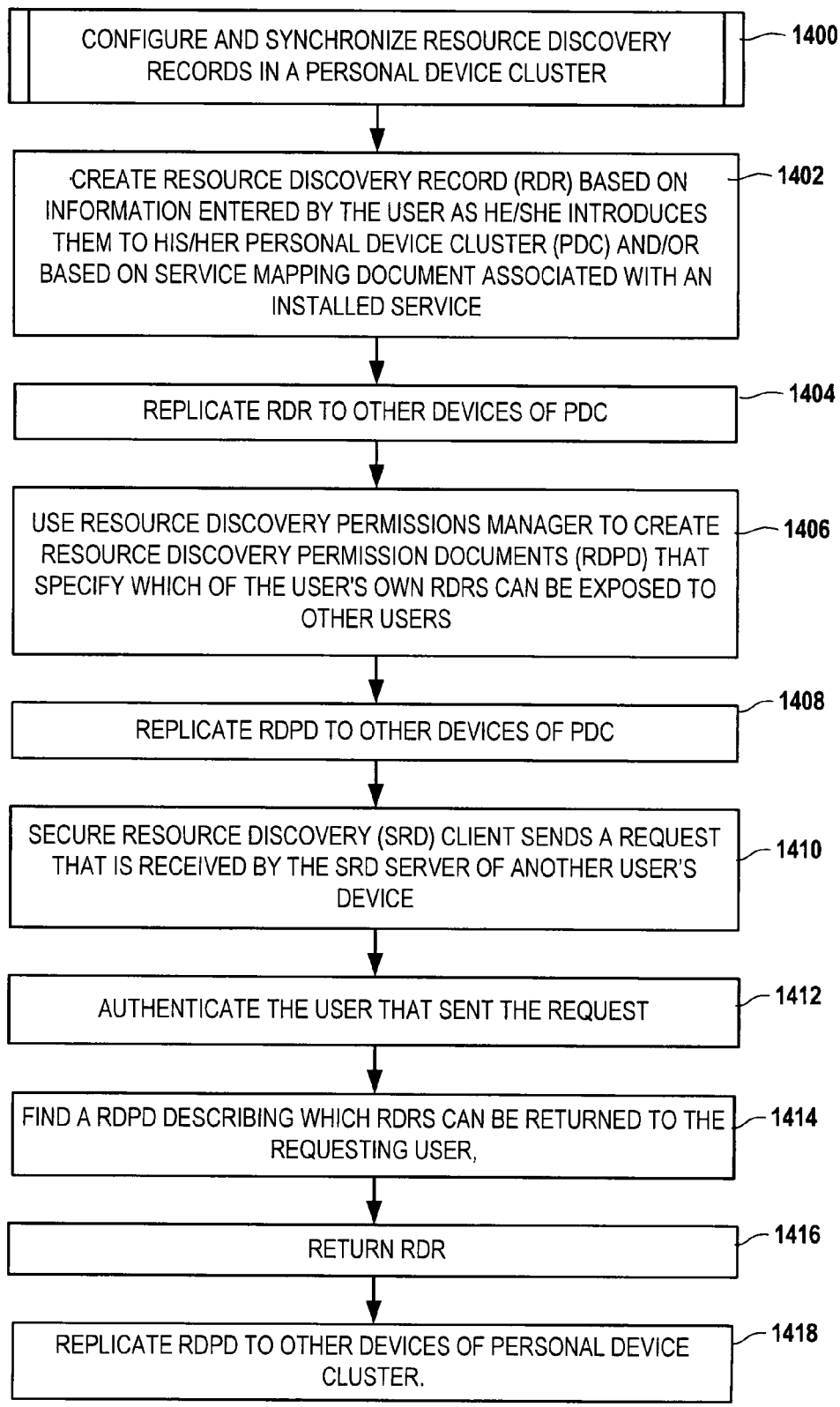

In FIG. 14, a flowchart shows a more detailed procedure 1400 for configuring and synchronizing resource discovery according to an embodiment of the invention. In particular, this procedure uses specific functional modules and data structures shown, for example, in FIG. 1. A resource discovery record (RDR) is created 1402 based on information entered by the user as he/she introduces them to his/her personal device cluster (PDC) and/or based on service mapping document associated with an installed service. The RDR is replicated 1404 to other devices of the PDC A resource discovery permissions manager is used to create 1406 resource discovery permission documents (RDPD) that specify which of the user's own RDRs can be exposed to other users. This RDPD is also replicated 1408 to the PDC. In order to determine remote resources that may be available, a secure resource discovery (SRD) client sends 1410 a request that is received by the SRD server of another user's device. The receiver of the request authenticates 1412 the user that sent the request. This authentication 1412 may use a PKI exchange as described in greater detail above. Assuming authentication 1412 was successful, an RDPD is identified 1414 that describes which RDRs can be returned to the requester. If any such RDR is found, is returned 1416 to the requester, which may then replicate 1418 that RDR to the PDC.

Figure 15:
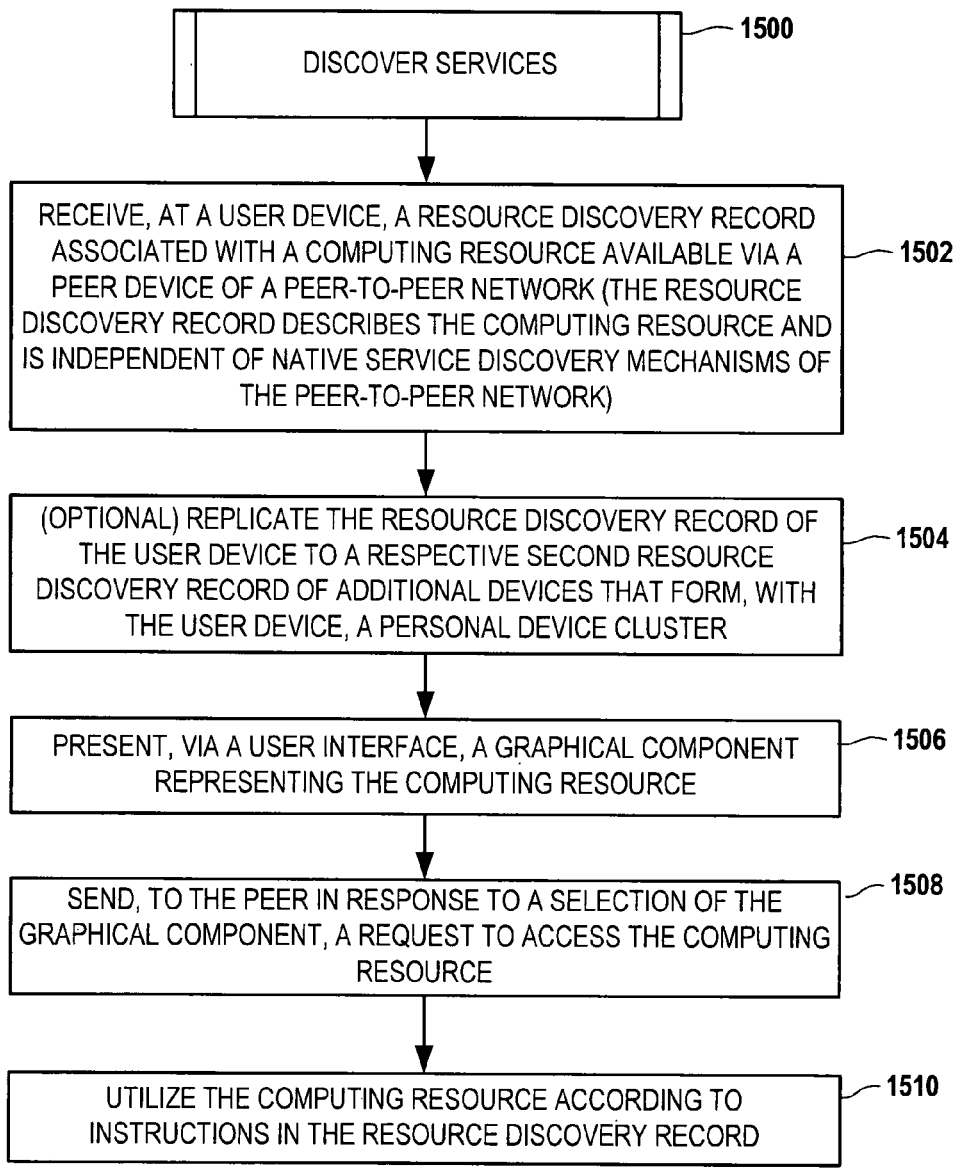

In reference now to FIG. 15, a flowchart illustrates a procedure 1500 for discovering services according to an embodiment of the invention. A user device receives 1502 a resource discovery record associated with a computing resource available via a peer device of a peer-to-peer network. The resource discovery record describes the computing resource and is independent of native service discovery mechanisms of the peer-to-peer network. The resource discovery record of the user device may optionally be replicated 1504 to a respective second resource discovery record of additional devices that form, with the user device, a personal device cluster A user interface presents 1506 a graphical component representing the computing resource. A request to access the computing resource is sent 1508 to the peer in response to a selection of the graphical component. The computing resource is utilized 1510 according to instructions in the resource discovery record.

Figure 16:
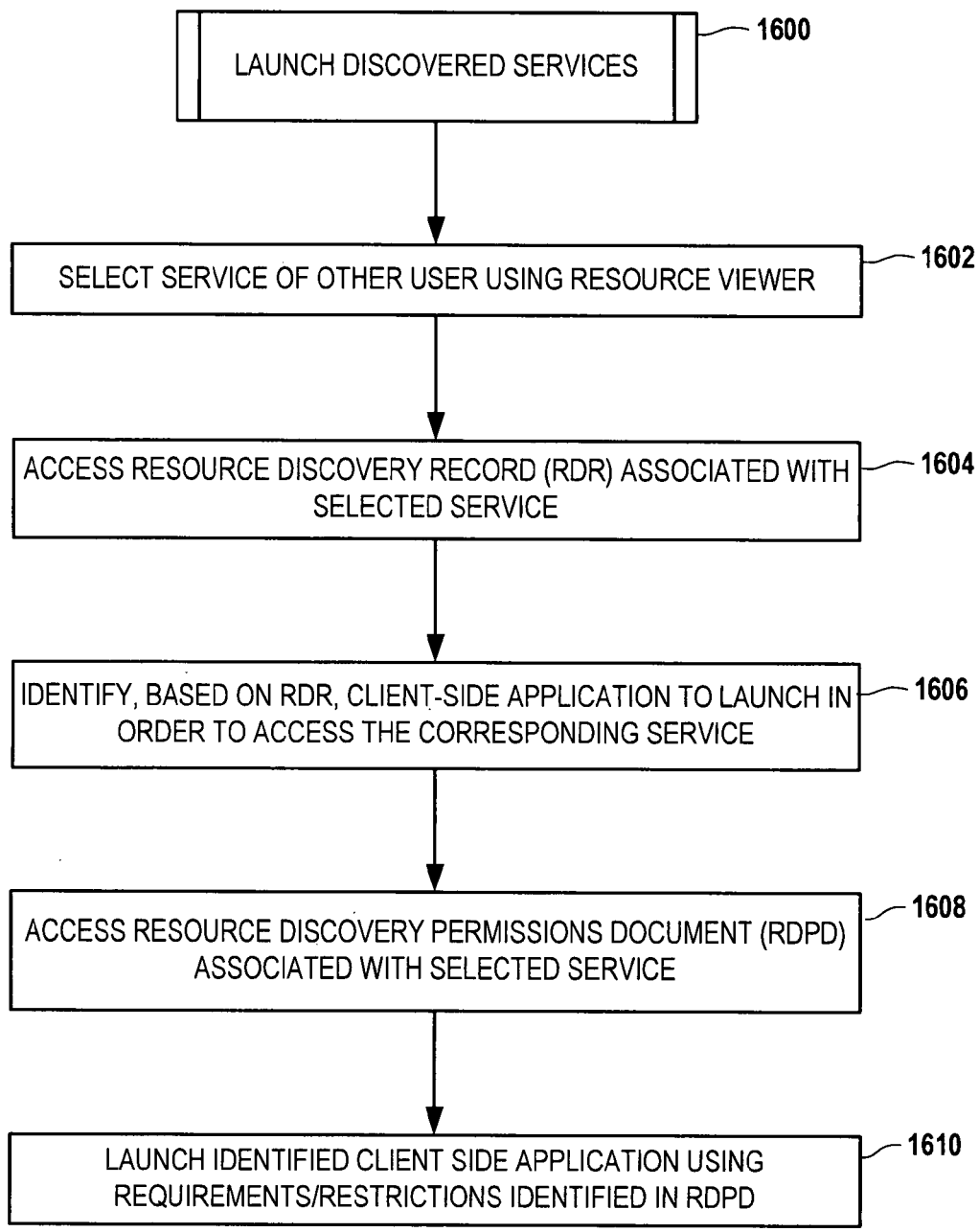

In reference now to FIG. 16, a flowchart illustrates a procedure 1600 for launching discovered services according to an embodiment of the invention. A service of another user is selected 1602 using a resource viewer. A resource discovery record (RDR) associated with selected service is accessed 1604, and based on the RDR, a client-side application to launch in order to access the corresponding service is identified 1606. A resource discovery permissions document (RDPD) associated with selected service is accessed 1608, and the identified client side application is launched 1610 using requirements/restrictions identified in the RDPD.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   determining by an apparatus within a user device whether a peer is permitted to view a resource discovery data available at the user device based upon an access right data, wherein the resource discovery data specifies how to access a resource of the user device via a peer-to-peer connection, and the access right data defines per contact permission of one or more contacts to view the resource discovery data; and
   causing, at least in part, transmission of the resource discovery data to the peer via the peer-to-peer connection based on the access right data.

2. A method of claim 1, wherein the resource discovery data is independent of a native service discovery mechanism of a network including the user device and the peer.

3. A method of claim 1, further comprising:
determining to replicate the resource discovery data, the access rights data, or a combination thereof to one or more other devices that are controlled by or assigned to one user.

4. A method of claim 3, further comprising:
synchronizing the resource discovery data, the access rights data, or the combination thereof at the user device and the one or more other devices.

5. A method of claim 3, further comprising:
determining to render a representation of the resource of the user device, a resource of the one or more other devices, a resource of the one or more contacts associated with the user device, or a combination thereof at a user interface of the user device according to access right data associated with the respective resources.

6. A method of claim 1, further comprising:
determining a service application as the resource based on the resource discovery data, wherein the resource discovery data further specifies usage permission; and
modifying the service application based on the usage permission.

7. A method of claim 1, further comprising:
determining to transmit the access right data to the peer via the peer-to-peer connection.

8. A method of claim 1, wherein the resource discovery data specifies an application to be launched at the peer for accessing, at the user device, a service, a computing resource, or a combination thereof.

9. A method of claim 8, further comprising:
causing, at least in part, modification of the operation of the application based on the access right data.

10. An apparatus comprising:
at least one processor; and
at least one memory including computer program code for one or more programs,
the at least one memory and the computer program code configured to, with the at least one processor, cause the apparatus within a user device to perform at least the following,
determine whether a peer is permitted to view a resource discovery data based upon an access right data, wherein the resource discovery data specifies how to access a resource of the user device via a peer-to-peer connection, and the access right data defines per contact permission of one or more contacts to view the resource discovery data available at the user device; and
cause, at least in part, transmission of the resource discovery data to the peer via the peer-to-peer connection based on the access right data.

11. An apparatus of claim 10, wherein the resource discovery data is independent of a native service discovery mechanism of a network including the user device and the peer.

12. An apparatus of claim 10, wherein the apparatus is further caused to:
determine to replicate the resource discovery data, the access rights data, or a combination thereof to one or more other devices that are controlled by or assigned to one user.

13. An apparatus of claim 12, wherein the apparatus is further caused to:
synchronize the resource discovery data, the access rights data, or the combination thereof at the user device and the one or more other devices.

14. An apparatus of claim 12, wherein the apparatus is further caused to:
determine to render a representation of the resource of the user device, a resource of the one or more other devices, a resource of the one or more contacts associated with the user device, or a combination thereof at a user interface of the user device according to access right data associated with the respective resources.

15. An apparatus of claim 12, wherein the apparatus is further caused to:
determine a service application as the resource based on the resource discovery data, wherein the resource discovery data further specifies usage permission; and
modify the service application based on the usage permission.

16. A non-transitory computer-readable storage medium carrying one or more sequences of one or more instructions which, when executed by one or more processors, cause an apparatus within a user device to at least perform the following steps:
determining whether a peer is permitted to view a resource discovery data based upon an access right data, wherein the resource discovery data specifies how to access a resource of the user device via a peer-to-peer connection, and the access right data defines per contact permission of one or more contacts to view the resource discovery data available at the user device; and
causing, at least in part, transmission of the resource discovery data to the peer via the peer-to-peer connection based on the access right data.

17. A method comprising:
receiving at a peer a resource discovery data from a user device via a peer-to-peer connection as determined based on an access right data by the user device that the peer is permitted to view the resource discovery data available at the user device, wherein the resource discovery data specifies how to access a resource of the user device via the peer-to-peer connection, and the access right data defines per contact permission of one or more contacts to view the resource discovery data; and
determining to access the resource over the peer-to-peer connection based upon usage permission specified in the resource discovery data.

18. A method of claim 17, further comprising:
determining a client application for accessing the resource based on the resource discovery data; and
modifying the client application based on the usage permission.

19. A method of claim 17, further comprising:
determining to render a representation of the resource, a resource of the one or more other devices controlled by or assigned to a user of the user device, a resource of the one or more contacts, or a combination thereof at a user interface of the peer based on access right data associated with the respective resources.

20. A method of claim 19, further comprising:
determining to access the resource of the one or more other devices, the resource of the one or more contacts, or a combination thereof over the peer-to-peer connection based upon usage permission specified in resource discovery data corresponding to the resources.

21. A method of claim 17, further comprising:
receiving the access right data from the user device via the peer-to-peer connection; and determining to replicate the resource discovery data, the access rights data, or a combination thereof to one or more other devices that are controlled by or assigned to the peer.

22. A method comprising:
  determining by an apparatus within a user device whether a peer is permitted to view a resource discovery data available at the user device based upon an access right data, wherein the resource discovery data specifies how to access a resource of the user device via a peer-to-peer connection, and the access right data defines per contact permission of one or more contacts to view the resource discovery data, wherein the resource discovery data specifies how to access a resource of the user device via the peer-to-peer connection, and the access right data defines per contact permission of one or more contacts to view the resource discovery data; and
  causing, at least in part, transmission of the resource discovery data to the peer via the peer-to-peer connection based on the access right data.

23. An apparatus of claim 22, wherein the apparatus is further caused to:
  determine a client application for accessing the resource based on the resource discovery data; and
  modify the client application based on the usage permission.

24. An apparatus of claim 22, wherein the apparatus is further caused to:
  determine to render a representation of the resource, a resource of the one or more other devices controlled by or assigned to a user of the user device, a resource of the one or more contacts, or a combination thereof at a user interface of the peer based on access right data associated with the respective resources.

25. An apparatus of claim 24, wherein the apparatus is further caused to:
  determine to access the resource of the one or more other devices, the resource of the one or more contacts, or a combination thereof over the peer-to-peer connection based upon usage permission specified in resource discovery data corresponding to the resources.

26. An apparatus of claim 22, wherein the apparatus is further caused to:
  receive the access right data from the user device via the peer-to-peer connection; and
  determine to replicate the resource discovery data, the access rights data, or a combination thereof to one or more other devices that are controlled by or assigned to the peer.

27. A non-transitory computer-readable storage medium carrying one or more sequences of one or more instructions which, when executed by one or more processors, cause an apparatus within a peer to at least perform the following steps:
  receiving at the peer a resource discovery data from a user device via a peer-to-peer connection as determined based on an access right data by the user device that the peer is permitted to view the resource discovery data available at the user device, wherein the resource discovery data specifies how to access a resource of the user device via the peer-to -peer connection, and the access right data defines per contact permission of one or more contacts to view the resource discovery data; and
  determining to access the resource over the peer-to-peer connection based upon usage permission specified in the resource discovery data.

* * * * *